M. E. PETERS, G. H. FATH & A. F. MILLER.
PNEUMATICALLY CONTROLLED BLANK GUMMING MACHINE.
APPLICATION FILED MAY 25, 1915.
1,239,815.
Patented Sept. 11, 1917.
14 SHEETS—SHEET 11.
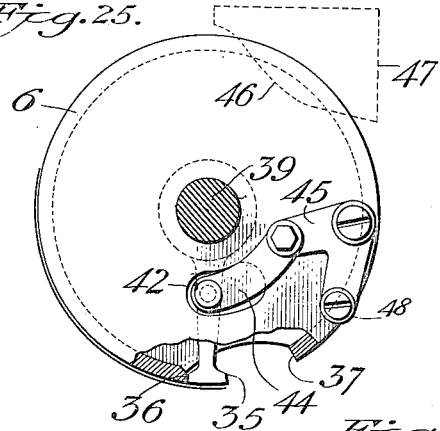
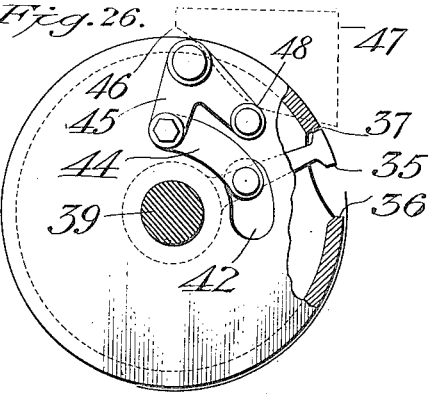
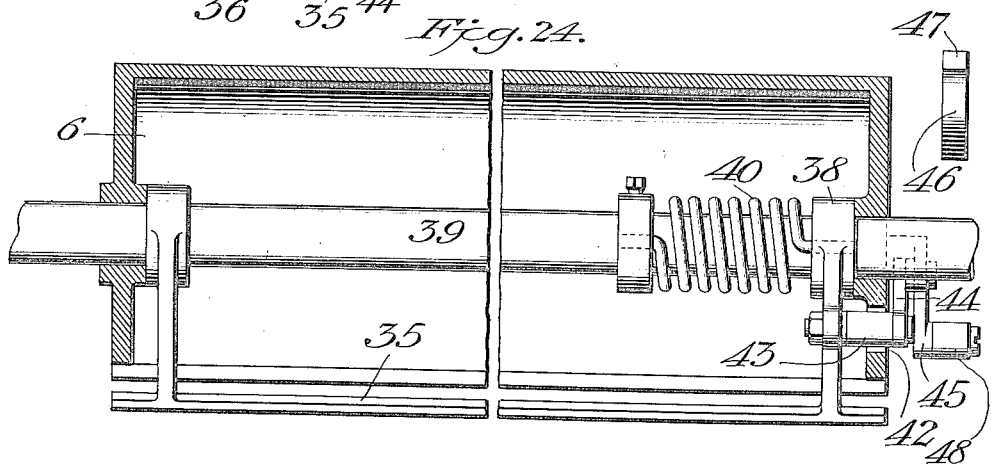
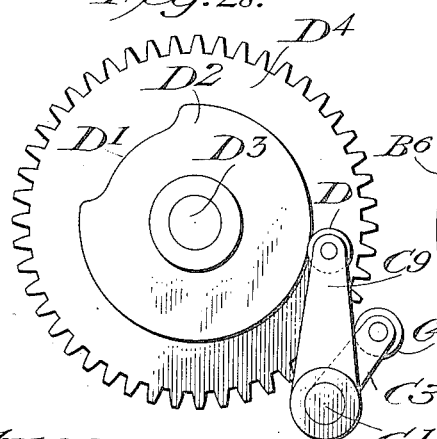
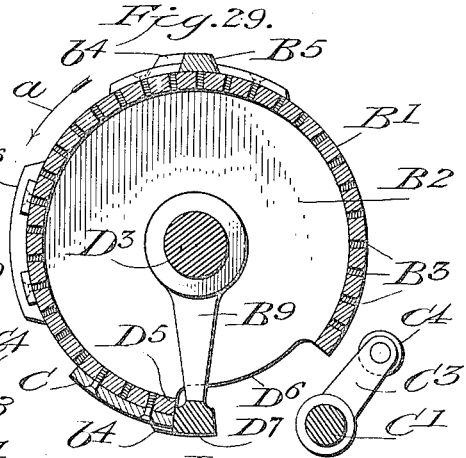
Witnesses:
G. Sargent Elliott.
Adella M. Fowle.
Inventors:
Melville E. Peters.
George H. Fath.
Albert F. Miller.
By H. S. Bailey, Attorney.

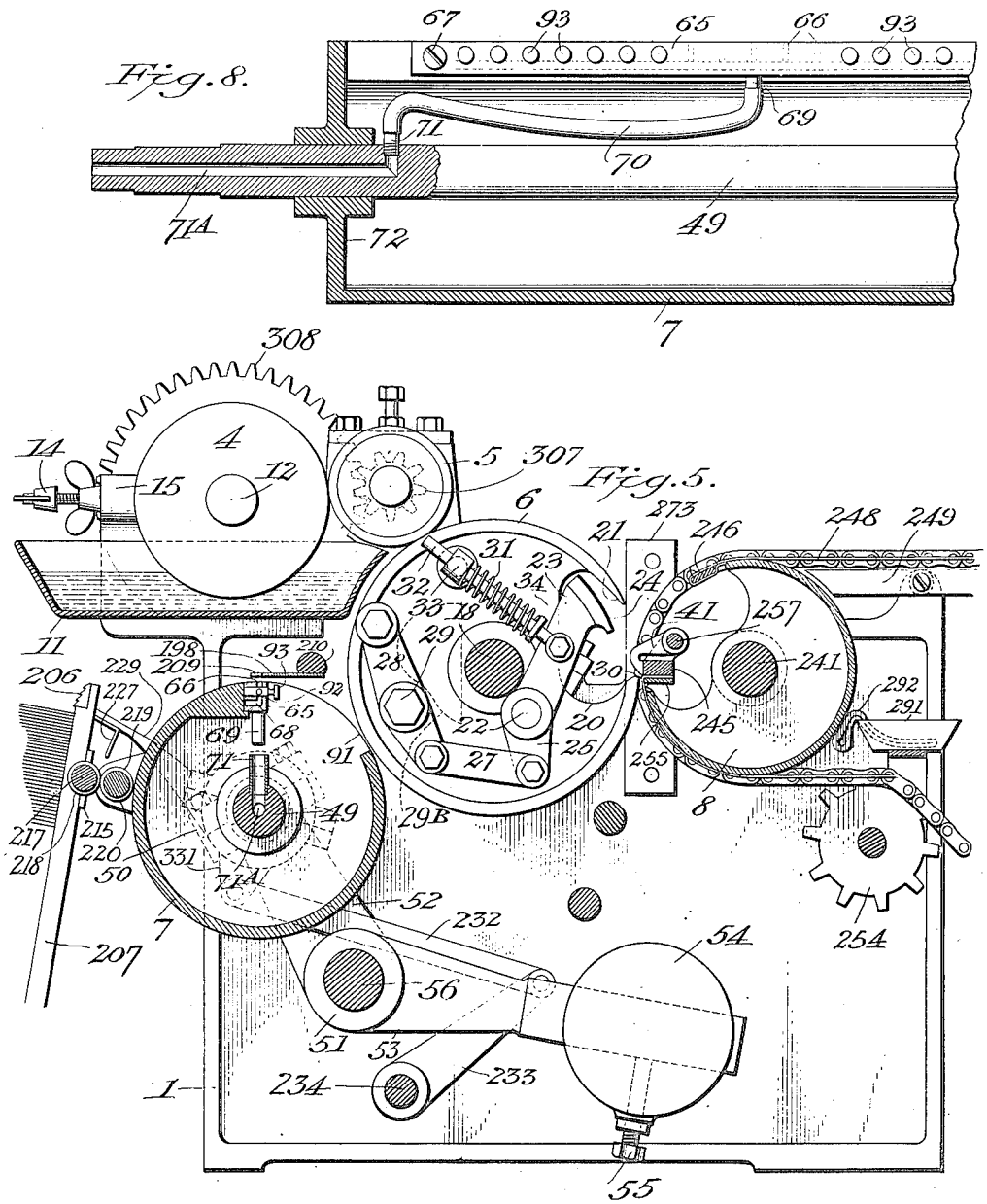

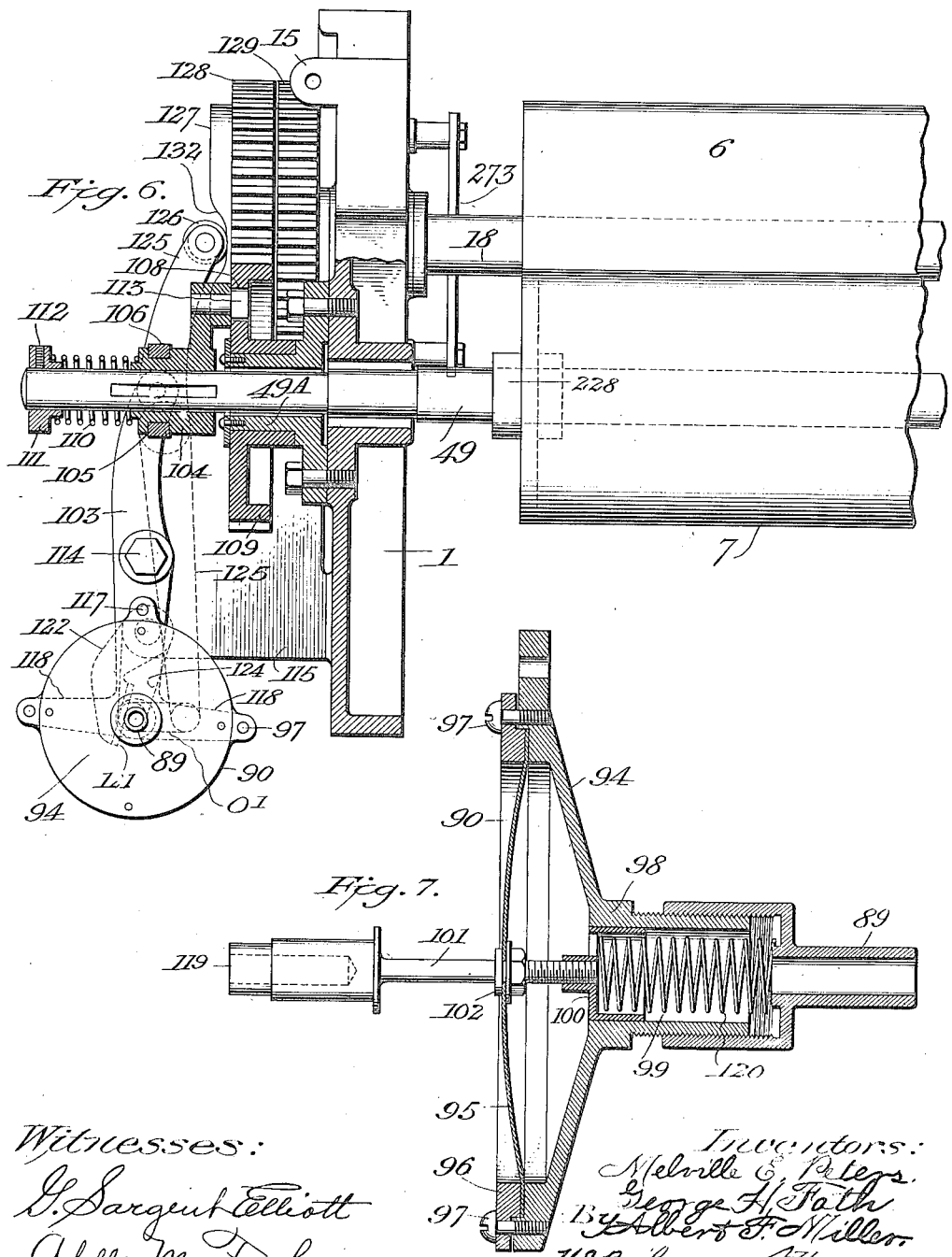

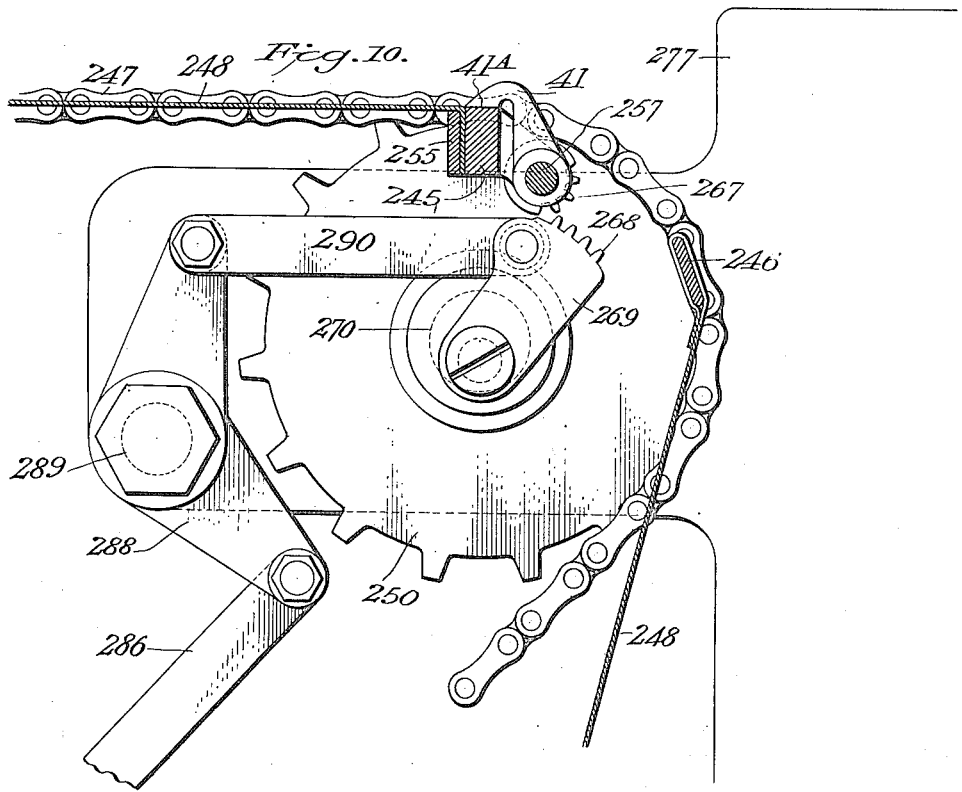
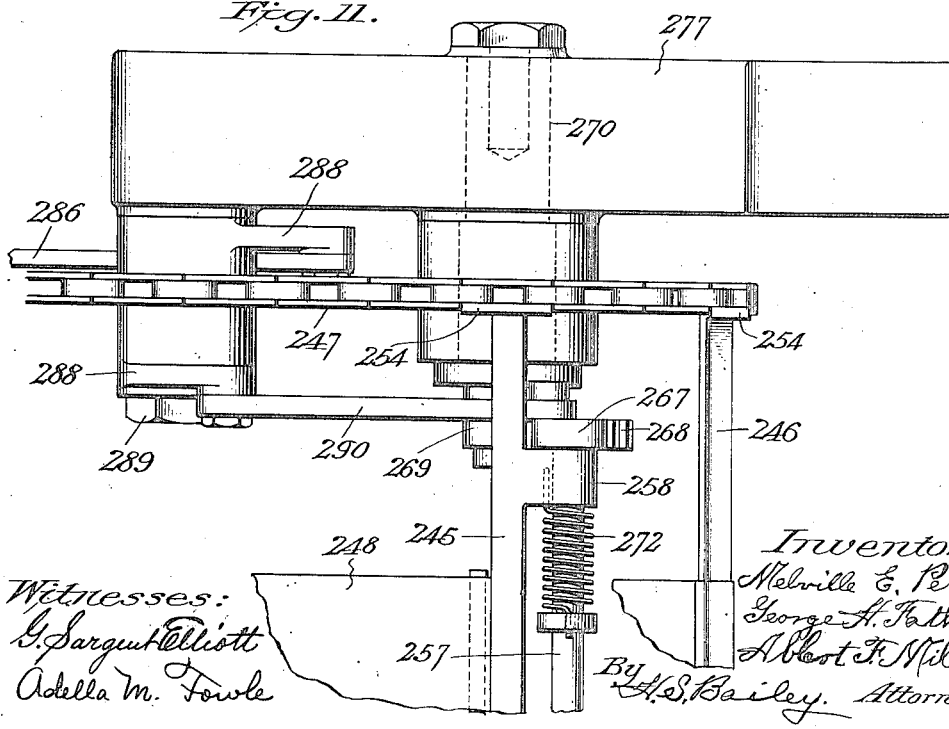

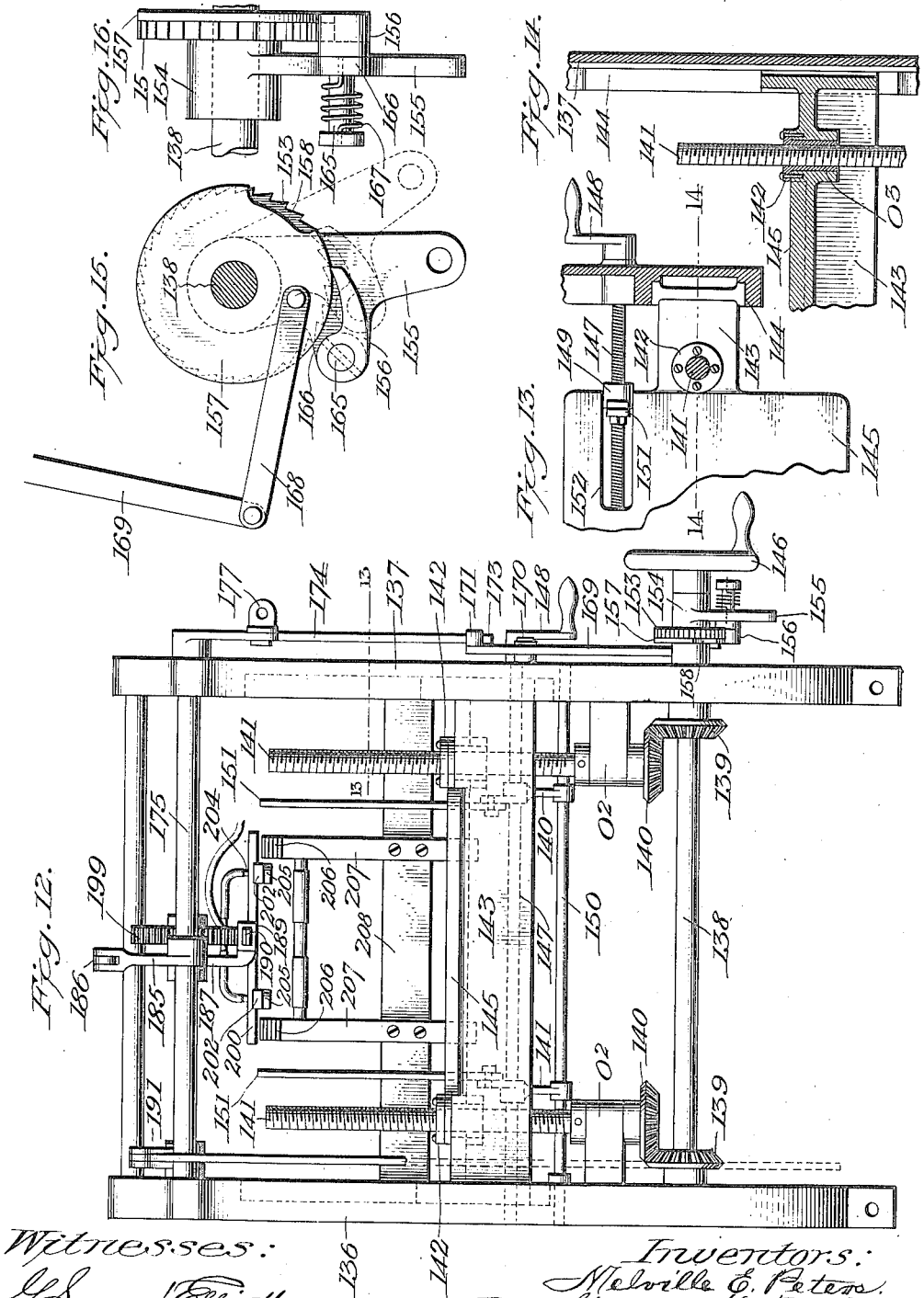

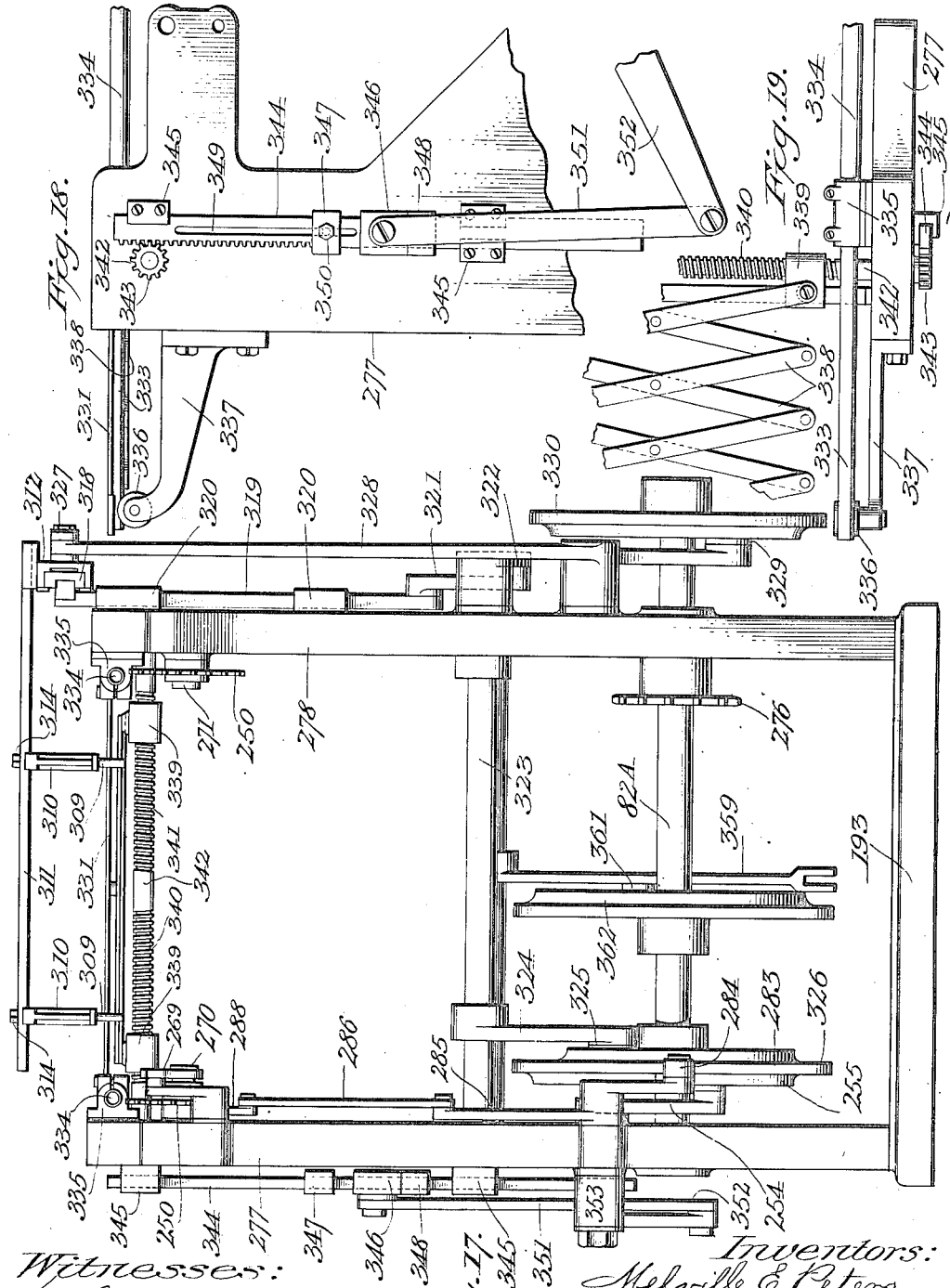

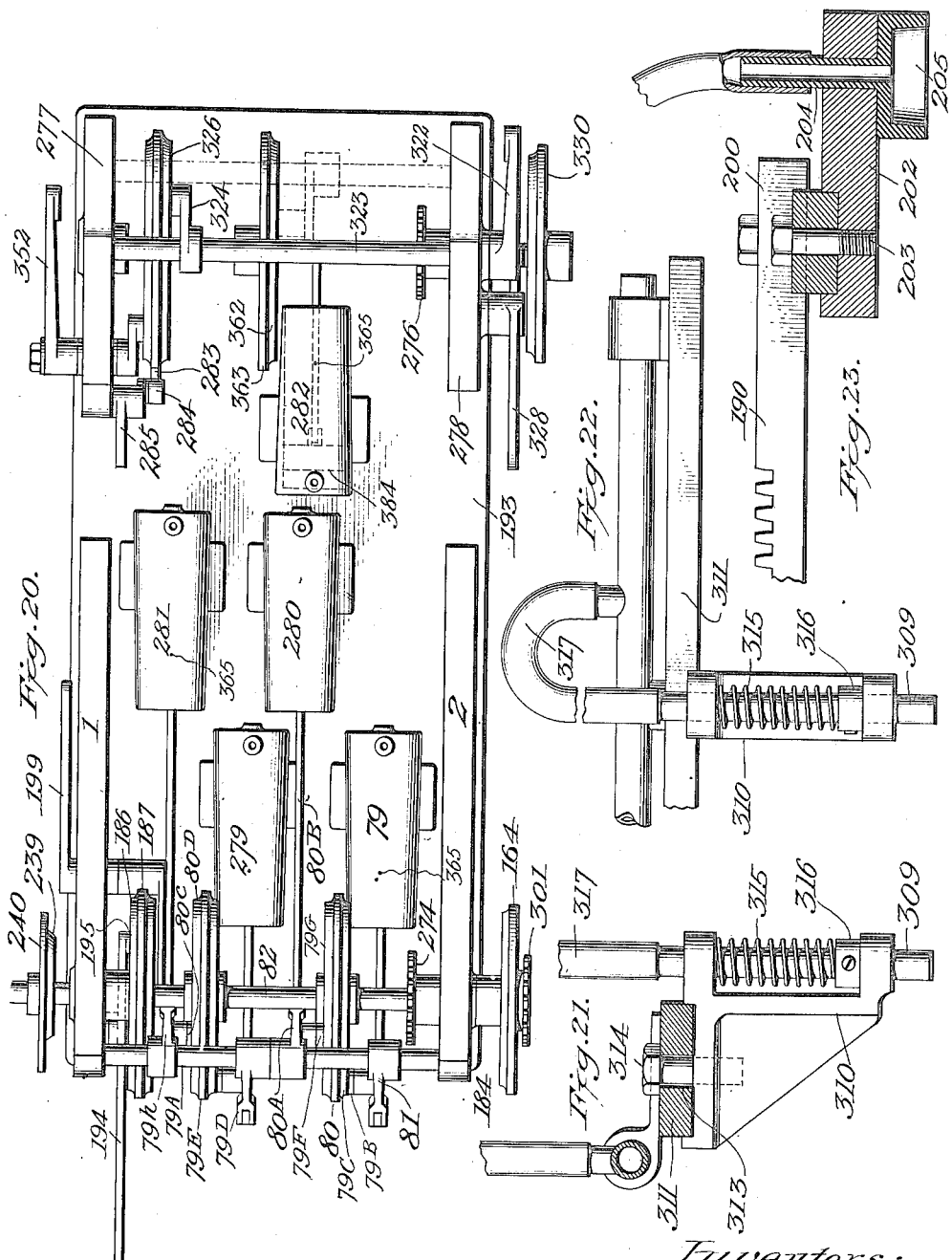

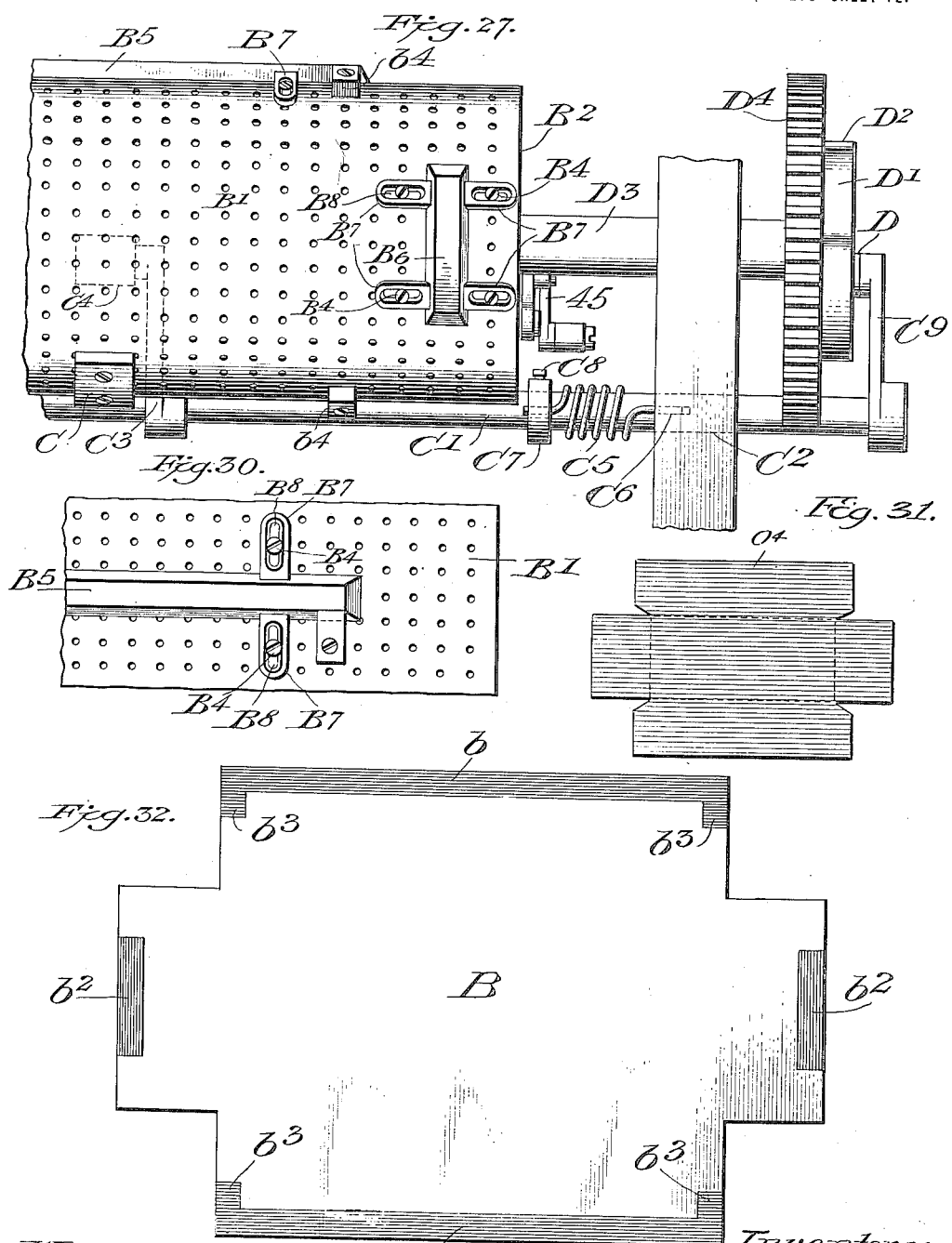

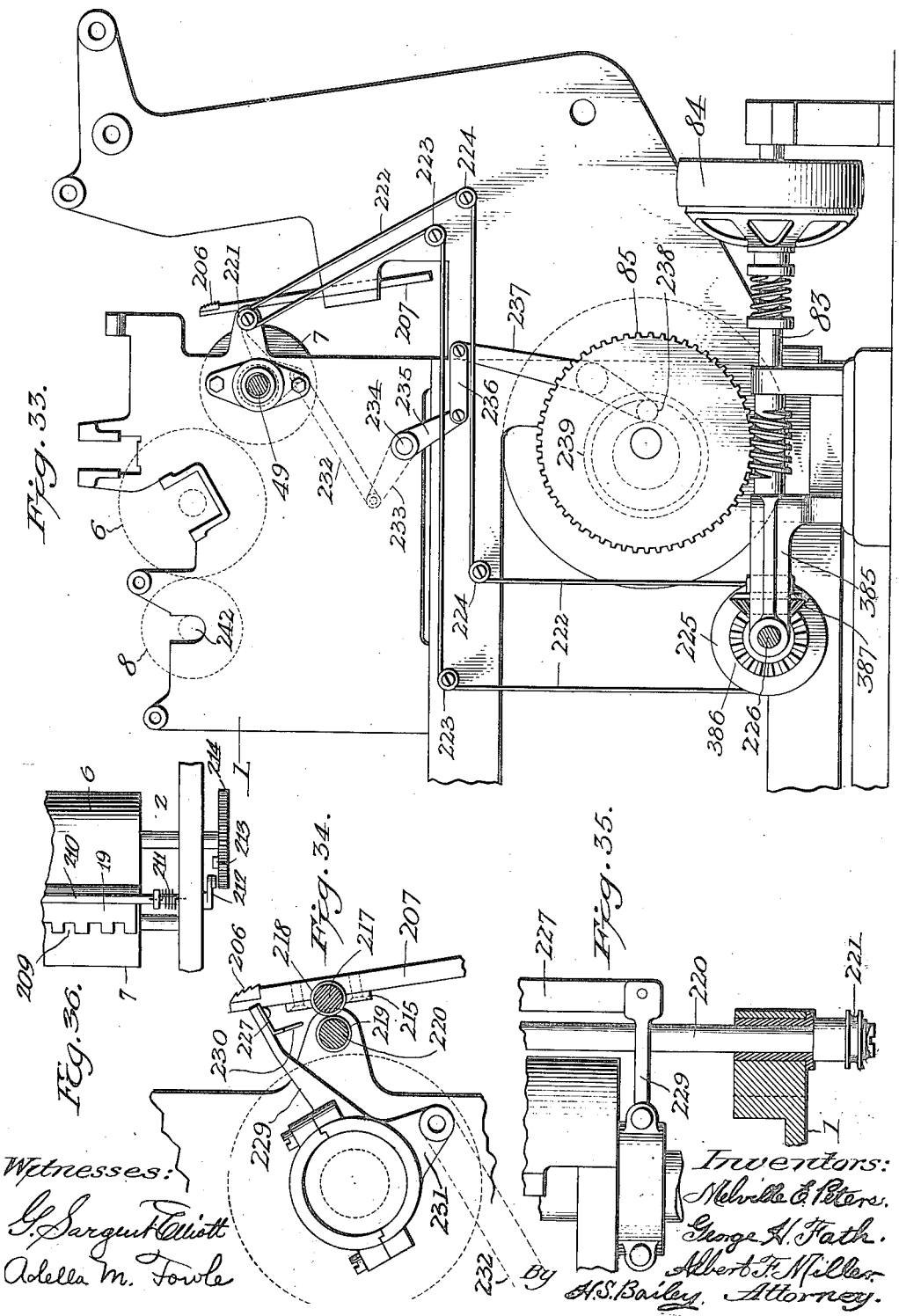

M. E. PETERS, G. H. FATH & A. F. MILLER.
PNEUMATICALLY CONTROLLED BLANK GUMMING MACHINE.
APPLICATION FILED MAY 25, 1915.

1,239,815.  Patented Sept. 11, 1917.
14 SHEETS—SHEET 14.

UNITED STATES PATENT OFFICE.

MELVILLE E. PETERS, GEORGE H. FATH, AND ALBERT F. MILLER, OF DENVER, COLORADO, ASSIGNORS TO THE PETERS PATENT RIGHTS COMPANY, OF DENVER, COLORADO, A CORPORATION OF COLORADO.

PNEUMATICALLY-CONTROLLED BLANK-GUMMING MACHINE.

1,239,815.        Specification of Letters Patent.     Patented Sept. 11, 1917.

Application filed May 25, 1915. Serial No. 30,471.

*To all whom it may concern:*

Be it known that we, MELVILLE E. PETERS, GEORGE H. FATH, and ALBERT F. MILLER, citizens of the United States of America, residing at the city and county of Denver and State of Colorado, have invented a new and useful Pneumatically-Controlled Blank-Gumming Machine, of which the following is a specification.

Our invention relates to a pneumatically controlled and automatically operating blank gumming and tempering machine for covering pasteboard and other boxes; and the objects of our invention are:

First, to provide a blank gumming machine having means including air actuated mechanism for feeding blanks one at a time into the machine, and to provide a mechanism that will stop and prevent a blank from feeding to the gumming rolls should it enter the machine slightly twisted out of straight alinement with the blank feeding and gumming mechanism, and that will automatically stop the blanks if perchance two or more should be fed at one time into the machine. We do not illustrate the platen of a box wrapping machine to which our gumming machine is adapted to deliver the blanks as fast as they are gummed as it does not form a part of our present invention, but the platen and the box wrapping machine of which it is a part are fully illustrated in our pending application, Serial Number 59,860, filed November 5th, 1915, for a box wrapping machine.

Second, to provide a blank gumming machine in which the blank itself will automatically trip and prevent its being fed to the gumming rolls if by chance it enters the machine out of straight alinement with, and unless it enters the machine from its feeding mechanism in perfectly straight alinement with the gluing rolls, and that will apply a coat of adhesive gum of predetermined thickness to evenly fed blanks.

Third, to provide a blank gumming machine that is arranged to utilize the natural tendency of freshly gummed blanks to curl away from their gummed sides in removing the blanks from the gumming mechanism, and that automatically exposes and grips the front edge of each blank and grips it and peels it from the gumming roll and delivers each blank to a suitable endless conveyer.

Fourth, to provide a blank gumming machine that is provided with a blank feeding and gumming mechanism that will gum blanks and that will moisten their opposite ungummed side and will thus prevent them from curling up, and also provide means for the tempering of said gummed labels before they are discharged by the endless conveyer from the gumming machine, and that will automatically discharge them in a perfectly straight flattened out condition in intermittent order, that allows them to be fed instantly and in operative order to any operative box covering machine.

Fifth, to provide suitable means for keeping the labels in their progress through the machine automatically in proper registering relation with the several successively changing steps they take as they pass through the machine so that they can and will be delivered to any suitable predetermined point relative to the blank receiving platen of a box covering machine when discharging from the gumming machine.

Sixth, to provide means for coating with gum the entire surface of tight box wrapping blanks, and also of applying a coat of gum to the edges only of loose box wrapping blanks.

Seventh, to provide means for gumming and tempering blanks and for automatically feeding them by rapid, continuous and successive step movements to the center of the box wrapping platens of a box covering or wrapping machine.

Eighth, to provide means for cleaning the gummed blank gripping fingers after gripping, holding and releasing each blank as it comes from the blank gumming cylinder.

Ninth, to provide means for quickly removing an out of alinement blank from the feeding mechanism without interfering with the regular feeding action of properly alined blanks. And Tenth, to provide means by which a stack of blanks are fed automatically to an air suction blank gripping and feeding mechanism at such predetermined intervals as the air suction blank gripping and feeding mechanism requires that the stack be advanced within its operative blank engaging and feeding movements.

We accomplish these objects by the mechanism illustrated in the accompanying drawings, in which:

Fig. 5, is a vertical sectional view through the forward portion of the machine, showing the feeding and transmission cylinder in section, while the gumming cylinder is in end elevation, to show the manner of operating the segment which frees one end of the gummed blank, the gum supplying rolls being also shown.

Fig. 6, is an end elevation partly in section, illustrating the mechanism for disconnecting the shaft of the blank feeding cylinder from its operating gear.

Fig. 7, is a vertical sectional view of the pneumatically operated diaphragm and its casing and the stop pin by which the lever for operating the clutch of the feed cylinder operating gear is released.

Fig. 8, is a longitudinal sectional view of a portion of the blank feeding cylinder, showing the manner of connecting the suction box therein with an air passage in its shaft.

Fig. 10, is an enlarged vertical sectional view through the upper portion of the rear supporting frame, showing the manner of opening the grippers to release the gummed blank.

Fig. 11, is a plan view of the parts shown in Fig. 10.

Fig. 12, is a front view of the blank stack supporting table, its supporting frame, and the mechanism for raising and lowering said table.

Fig. 13, is a horizontal sectional view on the line 13—13 of Fig. 12, showing a portion of the table and one of its slideways.

Fig. 14, is a vertical sectional view on the line 14—14 of Fig. 13.

Fig. 15, is a side view of the mechanism for controlling the upward movement of the blank stack supporting table.

Fig. 16, is an edge view of Fig. 15.

Fig. 17, is a front view of the rear supporting frame and mechanism carried thereby, by which the blanks are removed from the machine.

Fig. 18, is a side view of the upper portion of the frame shown in Fig. 17, illustrating the manner of operating the blank discharging plate or table.

Fig. 19, is a plan view of the portion of the frame shown in Fig. 18, and illustrating more clearly the feed screw and its pinion, and one of the nuts carried by said feed screw to which one of the lazy tong arms is attached, together with one of the slideway tubes and the telescoping tubes supported thereby which carry the blank discharging table, the said table being removed.

Fig. 20, is a plan view of the bed plate and supporting frames and showing the front and rear cam shafts and their cams, the vacuum pumps which connect with the various suction elements, and the levers for operating said pumps.

Fig. 21, is a side view of one of the blank conveying suction tubes which remove the gummed blanks from the endless carrier, and convey them to the discharge plate, together with its supporting bracket and the cross bar to which said brackets are adjustably secured.

Fig. 22, is a front view of the parts shown in Fig. 1, and illustrating more clearly the manner of connecting the suction tubes with the pipe leading to one of the vacuum pumps.

Fig. 23, is a sectional view through one of the suction tubes which convey the blanks from the supporting table to the blank feeding cylinder, also showing the manner of connecting the same with a rock bar by which a reciprocating movement is imparted to the suction tubes.

Fig. 24, is a longitudinal sectional view of a modified form of the blank gumming cylinder in which the segment is of less width than the gap in the cylinder, the manner of operating the said segment being also slightly different from that shown in connection with the preferred form.

Fig. 25, is an end view partly broken away of the cylinder shown in Fig. 24, the segment being in position to receive and support one end of a gummed blank.

Fig. 26, is a similar view, the cylinder being turned to the position in which the blank is engaged by the gripper of the transmission cylinder, the segment being swung to the opposite position to that shown in Fig. 25, to expose the edge of the blank in order that it may be engaged by the said grippers.

Fig. 27, is a plan view of a loose wrap gumming cylinder, or one so arranged as to gum only a narrow strip adjacent to the edges of the blank and leave the remaining surface of the blank ungummed.

Fig. 28, is an end view showing the gear on the end of the loose wrap cylinder, and the cam and levers by which the presser roll which engages the loose wrap blank is operated.

Fig. 29, is a transverse sectional view of the cylinder.

Fig. 30, is a top view of a portion of the cylinder in the position shown in Fig. 29, showing one of the strips for gumming one of the end edges of a blank, and the manner in which the same is adjustably secured to the periphery of the cylinder.

Fig. 31, is a view of a blank the entire surface of which is coated with gum.

Fig. 32, is a view of a loose wrap blank showing a gummed strip along the side edges and portion of the end edges thereof.

Fig. 33, is a side view of the forward portion of the machine, looking at the opposite side to that shown in Fig. 1, and illustrating the means for operating the mechanism by which the irregularly fed blanks are removed before reaching the feed cylinder.

Fig. 34, is a section showing the lever and the rolls by which the irregularly fed blanks are removed.

Fig. 35, is a plan view of a portion of the mechanism shown in Fig. 34.

Fig. 36, is a plan view showing the presser and its actuating means which hold the blanks in contact with the feed roll after they have been released by the pneumatic feeding means.

Similar letters of reference refer to similar parts throughout the several views.

Referring to the drawings,—

Figure 1:
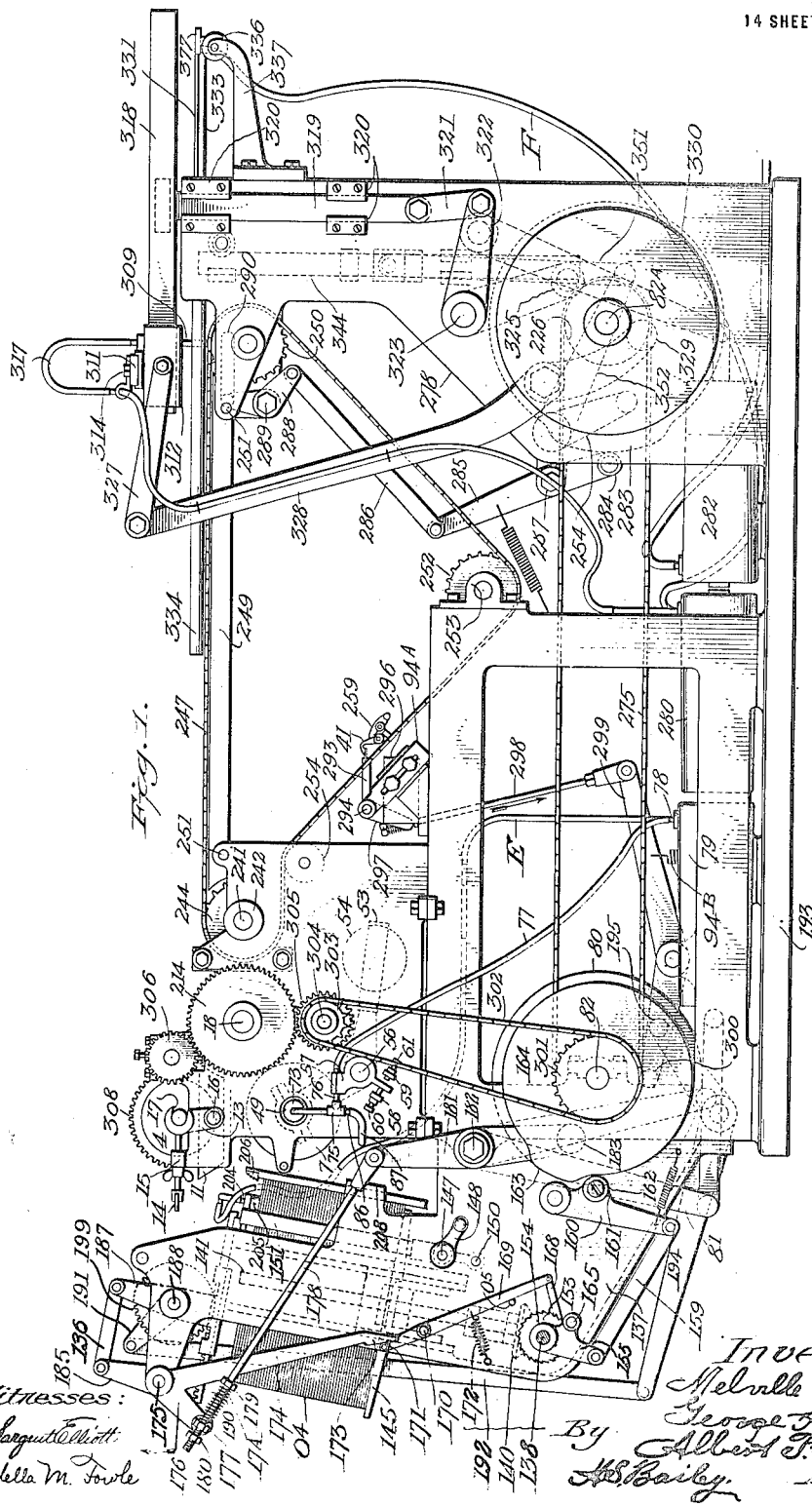
Figure 1, is a side elevation of our pneumatically controlled, automatically operating blank gumming and tempering machine for covering pasteboard and other boxes.
Figure 2:
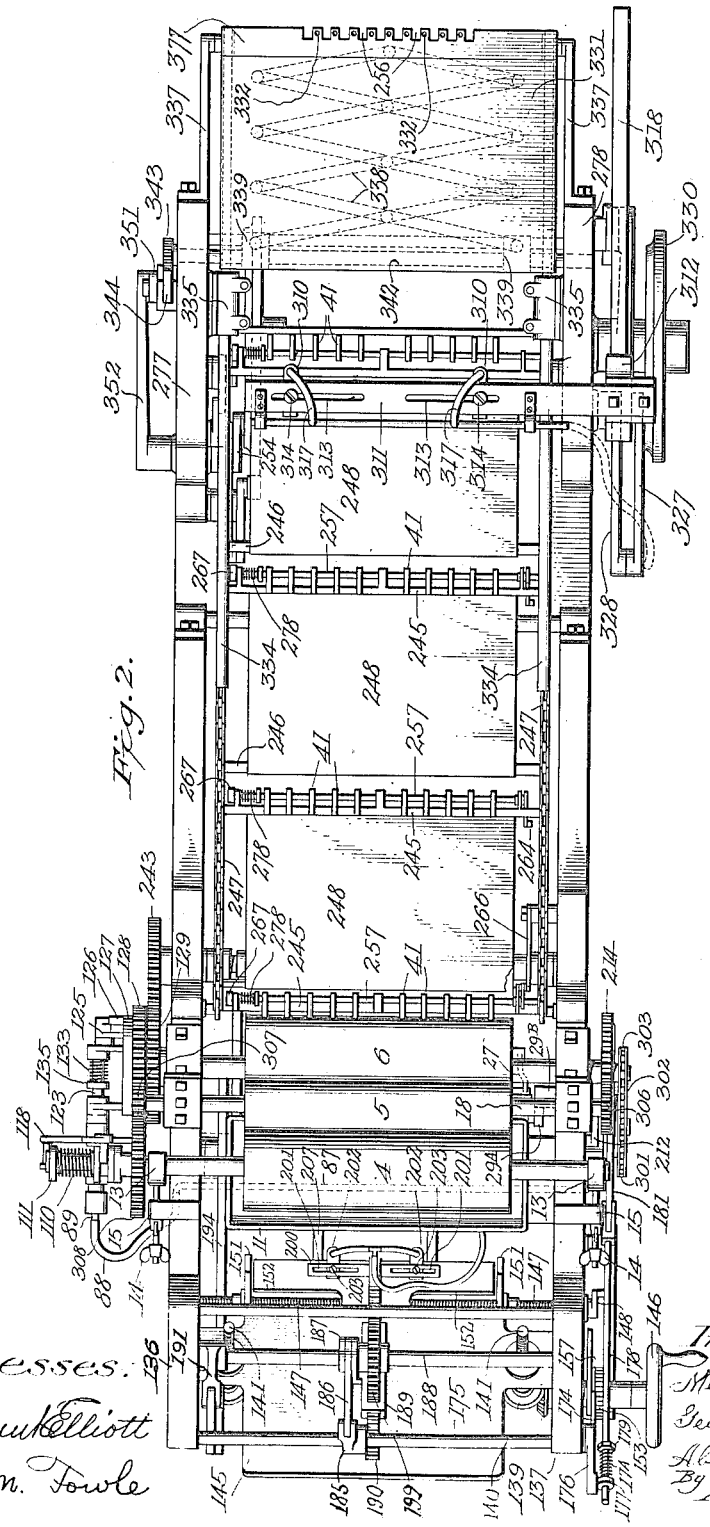
Fig. 2, is a plan view of the same.
Figure 3:
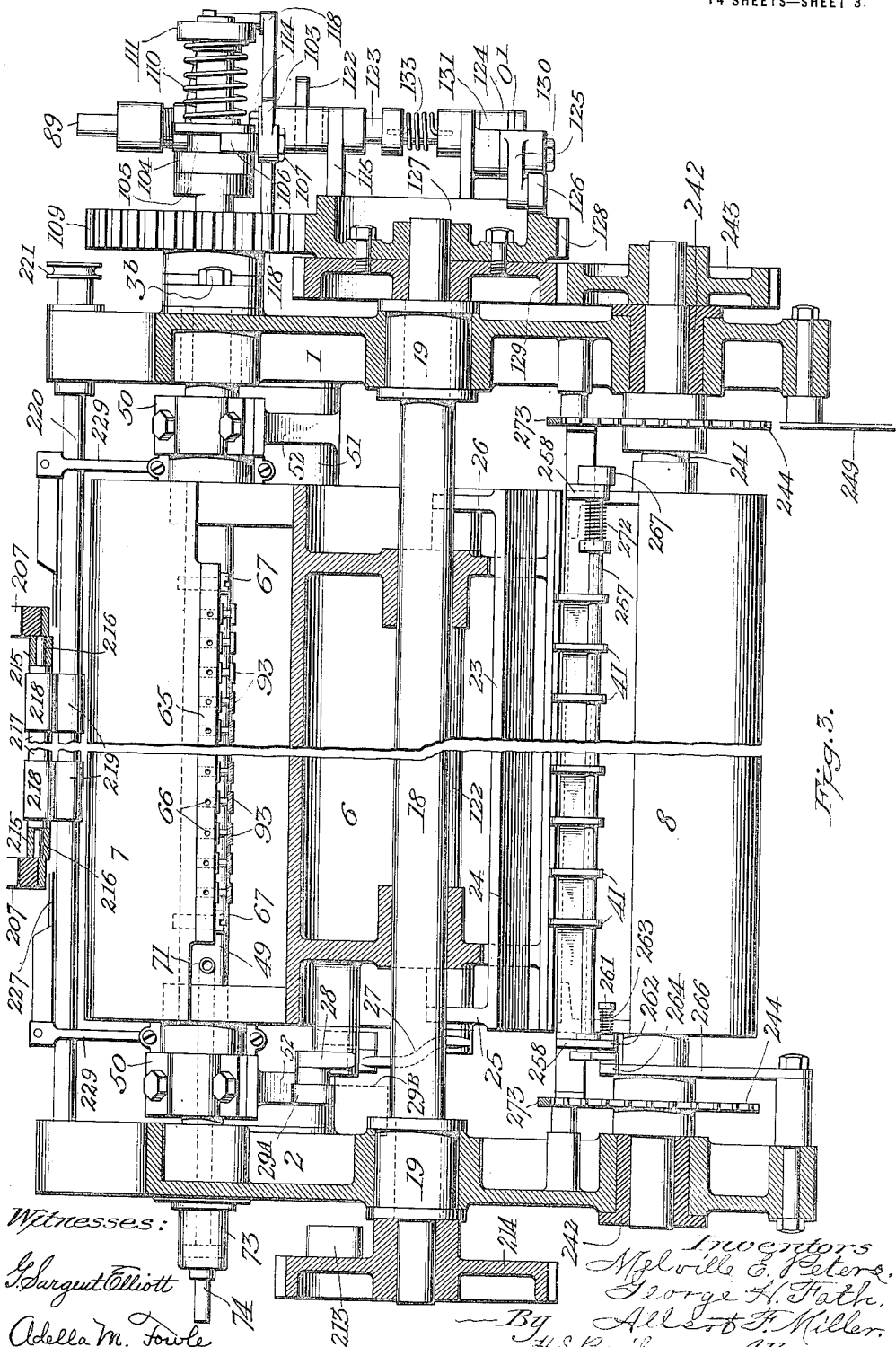
Fig. 3, is a sectional plan view showing the forward supporting frame, the blank feeding cylinder, the gumming cylinder, the transmission cylinder, and the gearing and other mechanism by which the said cylinders are operated and their rotation controlled.
Figure 4:
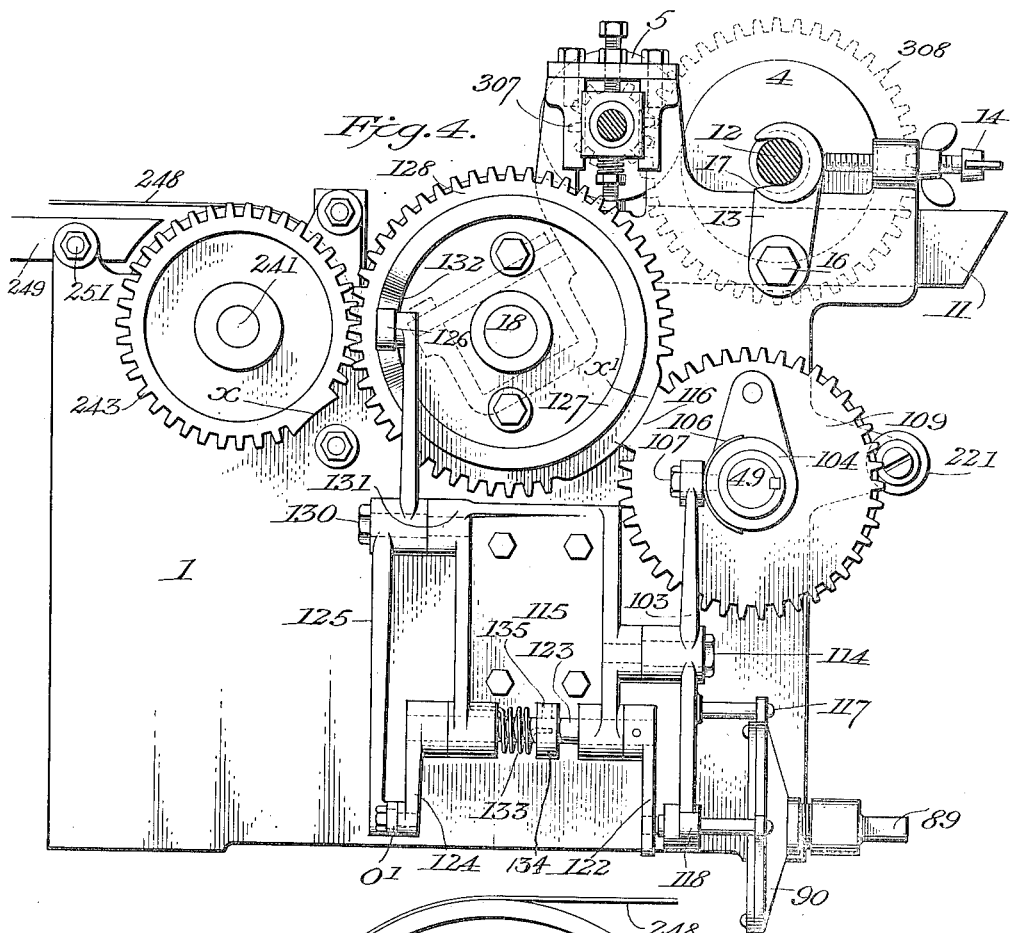
Fig. 4, is a side view of the forward supporting frame, showing the gears connecting the feeding, gumming and transmission cylinders, and which control their rotation, also the mechanism for disconnecting the shaft of the blank feeding cylinder from its operating gear.
Figure 9:
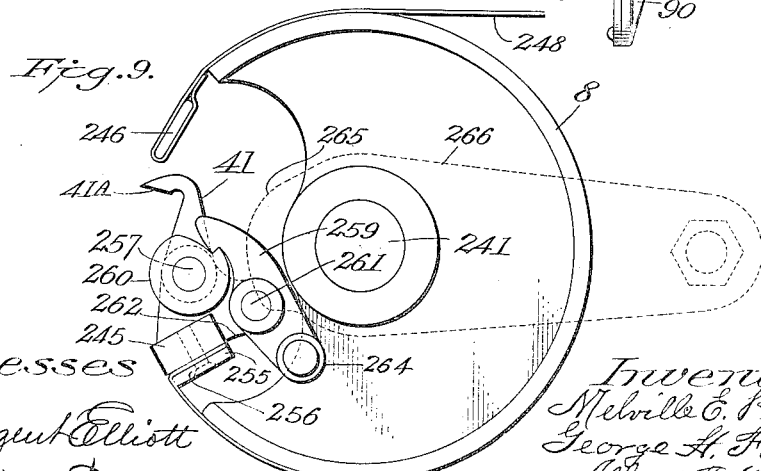
Fig. 9, is an end view of the transmission cylinder showing one of the blank grippers before being released by its pawl to grip a blank, the pawl-operating cam being shown in dotted lines.
Figure 39:
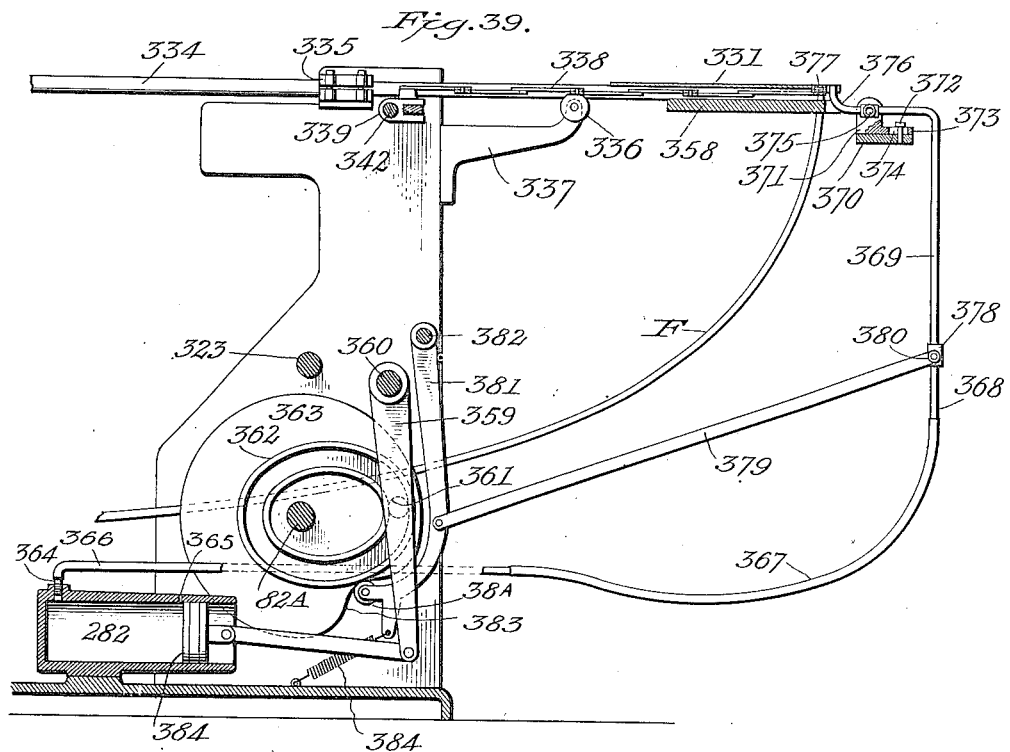
Fig. 39, is a sectional view through the discharge end of the machine showing the suction mechanism and its operating means for retaining the blanks after they have been fed to the box covering machine.

The numerals 1 and 2 designate the side frames of our gumming machine, which rests on and is secured to a bed plate 3. These side frames are secured together by a cross rod 3ᴬ, and they support rotatably rollers and cylinders 4, 5, 6, 7 and 8 that are arranged to receive and feed the blanks 9 and 10 (see Figs. 31 and 32), then to gum said blanks, and then to transfer them one at a time onto an intermittently moving endless traveling conveyer, on which the blanks are tempered, and that forms an integral part of the gumming machine. The function of this endless conveyer is not only to convey the blanks from the gumming mechanism but also to moisten the opposite side of each blank from its gummed side and thus the blanks are evenly dampened on both of their sides and are thus rendered limpid and in a condition termed in the art tempered. This endless traveling conveyer is provided with intermittent stop periods in its traveling movement. The conveyer however grips and peels the blanks from the gumming cylinder and feeds them onto itself while it is running or moving along between each of its stop periods, and that portion of its traveling movement where the conveyer picks up or grips the blanks one at at time, constitutes its blank gripping station. The intermittent stop periods of the conveyer only take place to allow the blanks to be gripped by an air suction mechanism that lifts them off from the conveyer, and the point in this endless conveyer's intermittent movement where these stops take place to allow the blanks to be removed from it, constitutes its blank releasing station, and this station is positioned at the rearward end of the traveling movement of the conveyer's upper or top portion.

Our gumming machine also discharges the blanks in a thoroughly gummed and tempered and straightened out and flat condition intermittently onto a table portion, which table portion advances directly over the center of the blank and box receiving platen of a box wrapping or covering machine, and delivers it to an air suction blank gripping device that is supportingly attached to the box wrapping machine, but which is operable from and by mechanism on our gumming machine, which grips each blank as it is delivered to it and holds it until the box wrapping machine's moving mechanism takes control of it to operatively cover a box with it.

The numeral 11 designates a pan member which is provided with a supply of liquid adhesive gum which consists of a thin liquid glue especially suitable for gumming blanks of paper and other material for covering pasteboard and other boxes. This gum pan is secured to the upper corner edge portion of the blank feeding in end of the gumming machine. Between the side frames we rotatively mount a shaft 12, on which the roller 4 is mounted, the peripheral surface of which projects into the pan and rotates in the supply of liquid gum therein.

The supporting shaft 12 of this gum supplying drum is provided with pivotally swinging bearings 13, which are adjusted to swingingly move the shaft and its gum supplying roller by adjustable finger actuated screws 14, that are threaded through lug portions 15, that are formed on the side frames of the machine.

These swinging bearings may be of any suitable construction and arrangement. We preferably however make them in the form of levers the lower ends of which are pivotally secured to the sides of the machine by bolts 16, and the upper ends of each of which are provided with an edge entering recess 17, which allows it to swing over the shaft. The recesses 17 terminate in vertically arranged curved bearing surfaces, in which the shaft rotates. The open recesses in these swinging bearings face the gum distributing roller 5, against which the gum supplying drum bears as it is rotated, and they support the gum drum's shaft rotatively while permitting it to be easily and quickly removed from them, and the gum pan, by turning back their adjusting screws and swinging them backward far enough to allow the shaft of the glue drum to be raised upward out of them.

The gum supplying drum as it rotates in the gum pan gathers up a thick coat of gum and carries it up against the gum distributing roller 5, and the thickness of the coat of gum the operator desires the glue distributing roller to receive from the glue supplying drum is regulated by adjusting the pressure of the gum supplying drum against the surface of the gum distributing roller through the medium of the screws 14, which are turned and adjusted against the adjacent edges of the swinging shafts supporting bearings until the distributing roller receives a coat of gum of the desired thickness.

The glue distributing roller 5 rotates against a cylinder 6 that gums or coats with gum each blank that feeds in straight and proper order into the machine, and together with its automatically operating blank tripping mechanism it trips up and stops all blanks that do not feed to this feed roller in straight and proper order, as will be explained fully hereinafter.

The cylinder 6 we term the blank gumming cylinder. It is a hollow cylinder mounted on a shaft 18 that is rotatively mounted in bearings 19 in the side frames of the machine. This blank gumming cylinder 6 is provided with a transverse gap or open hole 20 that extends through its peripheral surface throughout its entire length. The gap in this blank gumming cylinder is normally closed by segment member which corresponds to a segment portion of the cylinder's surface, and at each revolution it is opened at a predetermined point and draws away from the advancing edge of the blank, which is fed upon the cylinder to overlap this segment for a short distance along its edge, at which point the free and exposed edge of the blank is caught by a plurality of spring actuated pickers that grab it and feed it forward onto the blank tempering and discharging mechanism. The peripheral surface of this segment is of the same circumferential curve and radius as the periphery of the cylinder, and presents when in its place in the gap a smooth unbroken peripheral portion of true cylindrical surface of this gumming cylinder, and it normally fills the gap during about the whole of each revolution of the cylinder. The side 21 of the gap is the leading edge as the cylinder rotates, and this side tapers from a thin edge at a slightly curved angle rearwardly into the cylinder through the thickness of the shell of the cylinder, and to the opposite side of the axial shaft of the cylinder from this tapering edge 21 we pivotally mount on a shaft 22 the segment 23 of the cylinder 6.

The segment 23 comprises a curved strip portion 24 which is preferably of about the same thickness as the shell of the cylinder and of the same length as the gap in the cylinder. This curved portion of the segment is provided at its opposite ends with rock arms portions 25 and 26, which are provided with hubs that are mounted on and secured to the ends of a rock shaft 22 that extends through the hubs of the cylinder, which preferably with the flanges of the cylinder are arranged at a short distance inside of the ends of the cylinder in order to form a recess in each end of the cylinder in which the supporting arms of the segment and its operative mechanism could be housed. The segment is mounted within the cylinder in such relative relation to the axis of the cylinder that it swings up into and neatly fills the gap in its peripheral surface, and also swings inwardly into the cylinder below the tapered edge 21 of the gap.

Our invention contemplates that the gap forming and closing segment of the blank gumming cylinder may be moved to open and close the gap by any suitable mechanism. We preferably however arrange this feature of our invention in the following manner:

To the free end of one of the rock arms we secure one end of a link 27, the opposite end of which is secured to one end of a rock arm 28, which is pivotally secured by a bolt 29 to a lug formed on the adjacent flange of the cylinder. The opposite end of this rock arm is provided with a roller 29ª which is arranged to be engaged by a cam 29ᵇ that is secured to the adjacent side frame of the machine as the cylinder 6 rotates. This gap closing segment is held normally closed against the elge 30 of the gap by an expansive spring 31, which is mounted on a pin 32, which is pivotally secured at one end to one of the rock arms of the segment, and its free end is slidably secured to an eye bolt 33 that is secured to a lug that is formed on the adjacent flange of the cylinder. A collar 34 is formed on the pin 32 against which and between which and the eye bolt the spring 31 bears with an expansive pressure that forces the segment into the gap and holds it there against the side edge 30 of the gap until the cam engages the roller of the rock arm and moves it and its link 27 to swing the segment backward and down into the cylinder under the opposite side edge of the gap. As the cylinder rotates it is so timed relative to the feeding movement of each blank that the advancing edge of the blank is moved by the feeding roller 7 against and onto the surface of the segment and within about a quarter of an inch to a half of an inch of the advancing edge of the gap of the cylinder, in which position it remains until the cylinder rotates a part of its full revolution. Then when the segment has arrived in operative relation to the pickers it is instantly thrown back into the cylinder out of the gap by its lever and cam mechanism, which leaves the advancing edge of the blank hanging over the edge of the gap in the clear space of the gap, and this exposed and free edge of the blank is instantly caught by the pickers and is peeled off by them from the gumming cylinder onto the cylinder 8, from which it is carried onto tempering aprons that form a part of the blank tempering and conveying mechanism, as will be hereinafter fully described.

In Figs. 24, 25 and 26 we illustrate a modification of the movable segment of this blank gumming cylinder. In this modification the segment 35 is a partial gap filling segment and is made to normally stand against the edge of the gap, and the feed movement of the advancing edge of the blank is so timed relatively to the rotative speed of the gumming cylinder that the advance edge of the blank will be fed onto a part of the width of the segment from the blank feeding roller 7, and then when the cylinder has carried the advance edge of the blank into the path of the pickers, the segment is moved away from the edge 36 of the gap to the opposite edge 37 of the gap, which movement of the segment leaves the advancing edge of the blank exposed in the clear space of the gap and hanging over its edge, where it is instantly caught by the pickers and peeled off from the gumming cylinder, and is fed onto the blank tempering and discharging mechanism.

The segment in this modification of the blank gumming cylinder is provided with a hub portion 38 that is mounted directly on the cylinder's supporting shaft 39 around which a coiled spring 40 is placed, one end of which is secured to a collar on the axle and its opposite end is secured to the arm portion of the segment. This spring is arranged to hold the tongue with a constant resilient pressure up against the edge 36 of the aperture in the gumming cylinder. The gap aperture in the cylinder of this modification is made enough wider than the width of the segment to allow the segment to move far enough away from the edge of the blank that laps over onto its peripheral surface to allow the freed and loose edge of the blank to be engaged by the grippers 41, which will peel it off of the gumming cylinder onto the tempering and discharging mechanism.

This modified form of gap gumming cylinder is preferably made with end flanges that are even with the end of its length, and through one of them an oblong aperture 42 is formed, through which a stud 43 is extended from the outside of the adjacent end, and is secured to the arm of the segment at one end, the opposite end of which is pivotally connected to one end of a link 44, the opposite end of which is pivotally connected to one end of a rock arm 45, which is pivotally connected intermediate of its ends to the adjacent end of the cylinder, while the free end of this rock arm is provided with a roller that engages a cam surface 46 that is formed on the under side of a bar 47 which is secured in the rotating path of this roller and its rock arm, and to the adjacent side frame, by any suitable means. Then as the cylinder rotates when the gap registers in proper relative position to the pickers, the roller 48 engages the cam and moves the rock arm and its link and the segment against the tension of its spring 40 and forces the blank overlapping edge of the segment from under the blank and away from the side edge of the gap, thus leaving the edge of the blank free and in the path of the pickers, which with either segment and cylinder in use fly under resilient pressure over and under the free edge of the blank and press it and hold it firmly under a constant resilient tension against the gripper bars of the intermittently moving conveyer, as will be presently described.

We preferably use the gap closing segment for some classes of work, as the segment which normally fully fills the gap prevents gum working into the interior of the cylinder, while in the open gap modification gum will work slowly into the cylinder and necessitate the taking of the cylinder out of the machine and cleaning out its inside once in a while.

Before describing the blank gripping and tempering mechanism in detail, we will give a description of the blank feeding and its automatic tripping mechanism, which allows blanks that feed to the feed roller in straight alinement therewith to pass to the gumming cylinder and from it through the machine, and which stops all blanks that feed in a crooked or twisted or ruffled form from passing from the feeding mechanism and the feed roller to the gumming cylinder.

This blank feeding roller 7 is an intermittently rotating roller and it comprises a hollow cylindrical roller which is mounted on a shaft 49. This shaft is supported in balanced tilting journal boxes 50, which are formed on one end of a balanced rock arm frame 51, which normally holds the roller in an adjusted balanced position just close enough to the gumming cylinder to allow it to press a blank against the surface of the gumming cylinder with a slight but decided pressure. Consequently these two cylinders are positioned nearly but not quite the thickness of a blank apart, which would be the nearest adjusted and set position of the feed roller to the gumming cylinder. The feed roller has however a slight balanced reciprocal movement away from this adjusted and set position, by means of its balanced supporting frame, which is constructed as follows:

The two journal bearings 50 are formed at the end of arm portions 52, that project from a central body portion from which an arm 53 extends, on which a weight 54 is slidably and adjustably secured by a set screw 55. The body portion extends across the machine between the side frames 1 and 2 of the machine, and a shaft 56 extends through the body portion and is secured to it and its ends are journaled in bearings formed in the side frames. One end of this shaft extends beyond the side frame 2 and on its end a block 57 is secured. This block extends between two lugs 58 and 59 and set screws 60 and 61 are threaded from opposite vertical directions through the lugs 58 and 59, and are adjusted to clamp the free end of the block 57 between them. This arrangement allows the free end of this blank to be adjusted and set in adjusted positions to allow the journal bearings, the shaft and feed roller a balanced reciprocal movement of such a predetermined amount of distance to its normal position and distance from the gumming cylinder, as desired. This reciprocal balanced movement of the feed roller, together with the balance movement of its supporting frame, will seldom exceed a thirty-second of an inch, and the feed roller is normally held and operatively rotates at the thickness of or about the thickness of the blanks being fed through the machine to be gummed, it being understood that the feed roller must always force each blank with a slight pressure against the gumming cylinder, but at the same time the feed roller must never touch the gummed surface of the gumming cylinder. The shaft 49 upon which the feed roller is mounted and secured, extends loosely through apertures formed through the side frames 1 and 2, without touching them, and its opposite ends are provided with apparatus that will be described hereinafter.

The object of providing a reciprocating relief movement to the blank feeding roller is to provide a reciprocal compensating movement for the feed roller 7, away from and back to its normally set position, that will enable it to be adjusted to feed blanks that may vary in thickness and also to yield away from its set position and from the gumming cylinder, in case two or more blanks may perchance be accidentally fed to it and be carried by it to the gumming cylinder, and while we preferably illustrate and use this balanced weighted support for the feed roller and its shaft we illustrate a simpler arrangement of supporting the feed roller, which is automatically controlled to move away from and back to its set position enough less than the distance of the thickness of the blanks being fed from the surface of the gumming cylinder, to press the blanks normally against the surface of the gumming cylinder. In this modified arrangement, the shaft is rotatably journaled in boxes 62 that are slidably mounted in guideways 63 that are formed in the side frames 1 and 2 of the machine, and which are provided with an expansive spring 64 against which the boxes bear, and with a stud portion that is threaded to the frame. This stud is provided with adjusting nuts that permit the sliding boxes and the feed roller to be placed under the desired reciprocating resilient tension to allow the feed roller to reboundingly yield from its set positions relative to the gumming cylinder.

The hollow feed roller 7 is provided with a narrow air suction blank gripping and conveying device 65 that is secured along the side edge of the gap, that is nearest to the automatic blank feeding mechanism of the machine, and this air suction device is provided with a row or line of air suction apertures 66 that extend along its length, which are arranged and adapted to receive and grip by an air suction force the advancing edge of each blank as it is fed to this feed roller. In order to conveniently receive the blanks from the blank feeding mechanism, the feed roller is timed to stop or hesitate in its intermittent rotative movement when its line of air suction apertures register in alinement with the vertical axis of the feed roller, and as it stands in its stopped position at the end of each revolution, the advancing edge of each blank is fed directly onto this line of air suction apertures that form a part of the automatic blank feeding mechanism, by a movable air suction device, which will be presently described.

This feed roller 7 is however the first member of our gumming machine to receive a blank, and while we have preferably illustrated and use our machine equipped with an automatic blank feeding device, which we have especially designed for it, our gumming machine contemplates broadly any and every and all types of blank feeding machines and devices that are suitable for feeding blanks to it.

This feed roller 7 is geared and timed to make a full revolution and then to stop or hesitate in its turning movement long enough to allow a blank to be fed to its line of suction apertures, and it is timed to always make the full revolution including the stop in the same time the gumming cylinder makes one of its full continuous revolutions, and the feed roller is also so relatively timed to each revolution of the gumming cylinder, that its line of blank gripping suction apertures will grip, feed and deliver the advancing edge of each blank against and along the advancing edge portion of the reciprocating segment of the gumming cylinder, and as this segment together with the entire surface of the cylinder is covered with a thin coat of gum, the blank when pressed against the segment of the cylinder receives an even coat of gum along its advancing edge that is on the segment, as well as throughout its entire surface of its side that is pressed against the surface of the gumming cylinder by the rotating feed roller as the surface of the gumming cylinder including the entire surface of its gap filling segment is completely covered at all times with a thin even coat of adhesive liquid gum, which it received from the gum distributing roller 4, which supplies the gum distributing roller 5 with gum. Consequently when the feed roller feeds and presses a blank against the surface of the segment of the gumming cylinder, its advancing edge instantly sticks to the gummed surface thereof, and as the rotating feed roller rolls the blank off and against the surface of the gumming cylinder, the blank is wrapped and stuck to the gummed surface of a portion of its surface, as the cylinder rotates, and it is thus at the same time that an even coat of gum is being pressed on one side of it, being carried and fed forward by the gumming cylinder to the point where its segment flies back into the cylinder and opens the gap, which exposes the advancing edge of the blank to the action of the pickers, which instantly grab it and peel it off in the direction it would naturally curl up in, and convey it instantly to the tempering mechanism, which moistens its opposite side from its gum coated side and then discharges it in a position while it is in a limpid tempered condition to a point where it can be instantly fed to any operative box covering machine. Consequently each blank as it is fed forward and discharged from the gumming cylinder, is coated and covered on one of its sides with a coat of gum, which coat of gum may by proper manipulation of the gum distributing roller 5 be of any predetermined and desired degree of thickness.

The intermittent blank gripping, holding, feeding and releasing air suction device of the feed roller 7 may be of any desired construction and arrangement, as our invention in this respect contemplates broadly any air actuated device or mechanism that will grip, hold, move and release at a predetermined point in the rotative movement of a blank feeding roller, a box covering blank.

We employ in connection with the feed roller 7, an air suction holding and releasing device for feeding the blanks to the gumming cylinder. This air suction device comprises a thin hollow square shaped strip of metal that is detachably secured to the edge of the gap by screws 67, and through the top of this box a row of small air suction inlet apertures 66 are formed, in a straight line parallel with the longitudinal axis of the feed cylinder. These air suction apertures 66 may be positioned at any desired distance apart throughout its length, it only being necessary to use enough of them positioned close enough together and at equal distances apart to firmly grip and hold to the blanks by the air suction force of the air pump.

This air box is provided with a longitudinal chamber 68, into which each of the air suction apertures extends, and centrally of its length it is provided with an inlet nipple aperture 69 to which one end of a tube 70 is secured. The opposite end of this tube extends to a nipple 71 that is threaded into an aperture formed in the shaft 49 within the feed roller 7 near its left flange 72, where it intersects an axial aperture 71$^A$ formed in the left hand end of the shaft. A hollow cap 73 is secured to the end of this shaft from which a nipple portion 74 depends that terminates in a T fitting 75 from which a nipple member 76 extends horizontally and is connected to one end of a short piece of rubber tubing 77, the opposite end of which is connected by a nipple 78 to an air pump cylinder 79. This air pump is provided with a piston that is reciprocated by a cam 80 and lever mechanism 81. The cam is mounted on a shaft 82 which is driven by the clutch controlled driving shaft 83 and pulley 84 and gear driving mechanism 85 by and from which the entire machine is operated. A nipple 86 is connected to the opposite end of the T 75 and terminates in an elbow from which a pipe 87 extends through and across both of the side frames 1 and 2 of the machine, and is connected by a tube 88 to the inlet nipple 89 of an air suction diaphragm 90 which forms a part of the blank tripping mechanism, which will be presently described.

This blank gripping, feeding and releasing suction box is made long enough to receive and feed the longest blanks the machine will gum, and the machine will gum all sizes of blanks used for covering boxes, from about 3½ inches long by varying widths, up to between nineteen and twenty inches long and of varying widths, and when gumming blanks that are not wide enough to cover all of the air suction apertures in the suction box, those at the ends of the suction box not covered by the blank must be closed, and we have made provision to close all of the air suction apertures on each side of the center of the length of the suction box that are outside of and are uncovered when using the smallest sizes of blanks that the machine will coat with gum.

While various means could be employed for closing these air suction apertures, we preferably carry out this feature of our invention in the following manner:

This blank gripping suction box is provided along its accessible side in the gap 91 and within the feed roller commencing beyond those centrally located air suction apertures which would receive the narrowest blanks that would be run and gummed by the machine, with apertures 92 that extend transversely through the air suction box, and each of which is positioned to intersect one of the air suction apertures and in each transverse aperture a finger operating plug valve 93 is secured, which is arranged to open or close these air suction apertures. Consequently all air suction apertures that are outside of the size of blanks being run through and gummed by the machine are closed, and it is necessary that they should be closed because if one air suction aperture beyond a blank is left open, the suction is broken and the suction grip and hold are broken and rendered inoperative, and even when blanks that are wide enough to cover all of the air suction holes are fed into the machine in such an uneven and twisted condition as to expose one of the air suction apertures on either end of the suction box, the suction grip does not take place, as the vacuum is broken and the feed roller will not move and will miss its revolution, and will stand still until a blank is fed to it in a straight position. Then the advancing edge of the blank is placed over all of the air suction apertures and they instantly grip and hold it firmly down against the air suction box.

The automatic blank tripping device is adapted to trip up or break the air suction force of the feed roller by rendering it instantly inoperative, and it also operates to lock the feed roller against rotation when a blank feeds to the suction box in such a crooked, uneven, or partially folded or in any other way out of proper order and position to fully cover all of the air suction apertures of the suction box, or in other words, when a blank feeds so out of straight alinement or wrinkled to the longitudinal plane of the line of air suction apertures and to the longitudinal axis of the feed roller, that one or more air suction apertures 66 are left uncovered at either one or both ends of the air suction box, and inasmuch as the blanks feed into and through our machine at the rate of about fifty per minute, the tripping mechanism employed must act quickly and be controlled automatically by the continuous rotating movements of the gumming cylinder. This is essential, as the principal object of this trip is to arrest and stop the out of order blanks before they reach the gumming cylinder and clog it and the entire machine, which would necessitate stopping the machine and removing the clogging blank and cleaning the gumming cylinder.

Consequently our invention contemplates a pneumatically operating apparatus coöperating with means connected to and controlled by the gumming cylinder and the feed roller, that will trip up and stop blanks that are in any way out of order when they first reach the feed roller, which is the threshold of the machine, as the surest way of preventing their reaching the gumming cylinder.

Our invention in this respect contemplates any and all pneumatically operated apparatus coöperatively united with the machinery connected with the blank feeding and gumming mechanism of blank gumming machines. We preferably however carry out this feature of our invention in the following manner:

The air suction diaphragm 90 to which the air tube which leads from the T fitting 75 and the air pump 79, is connected, comprises a saucer-shaped disk 94 over which a diaphragm of flexible material, preferably leather, 95 is secured, which is clamped to the disk by a ring-like member 96, that is secured to the disk by screws 97. The diaphragm disk has a hub portion 98 which is provided with a chamber 99, in the inner end of which a sleeve 100 is slidably mounted. The bottom of this sleeve is provided with apertures that admit air from the diaphragm to its hub's chamber. A stem 101 is threaded to the sleeve, which passes through the diaphragm. This stem is provided with a nut that clamps the diaphragm against a collar shoulder 102 formed on the stem. This stem extends to and through and is slidably connected to the lower end of a rock arm 103. The opposite end of this rock arm 103 is pivotally secured to a hub 104, which is slidably mounted on and is feather keyed to the shaft 49, that the feed roller is mounted on. This hub is provided with an annular groove 105, in which a segment of a collar 106 fits loosely, and that is secured to the upper end of the rock arm 103, by a cap screw 107. This hub 104 forms the supporting part of a locking bolt 113, and the rock arm is arranged and adapted to move the locking bolt through the medium of this collar segment bearing in the annular groove of the hub of the locking bolt out of locking engagement with a keyway recess 108, that is formed in the adjacent face of an adjacent spur gear 109, as will be presently described, and this locking bolt is held normally against the face of the gear as the gear rotates when the locking bolt is not locked to it, by an expansive spring 110, which is mounted on the end of the shaft 49, and is confined there by a collar 111, that is secured to the end of the shaft by a set screw 112. Consequently this expansion spring holds the locking bolt in operative locking position to the locking recess of the gear, in which the locking bolt is adapted to fit loosely, while the upper end of the rock arm when moved by mechanism to be presently described that coöperates with the diaphragm and its reciprocating stem 101, moves the locking bolt's hub to unlock the locking bolt from the recess in the spur gear. The spur gear 109 is an intermittently rotating gear, it being made so by leaving several of its teeth off and forming in their place a smooth curved portion 116, that registers with a similar smooth portion on its driving gear. This intermittently rotating gear is loosely mounted on a hub 49$^A$, that surrounds the feed roller's shaft 49, loosely enough to allow this shaft to move or float on its swinging bearings on it, as the feed roller has an adjustable reciprocal balanced or floating movement toward and away from the surface of the gumming cylinder, as above described, and this shaft 49 also has a free balanced or floating movement in the apertures of the frame, and in this hub 49$^A$, which is secured to the side frame 1 by cap screws 3$^B$. Consequently this intermittently rotating gear is an idler gear and is mounted on the hub 49$^A$, and the feed roller and its shaft have a floating movement in this hub entirely independent of the rotative bearing of the intermittently rotating spur gear 109, that drives them through the medium of the locking bolt that is feather-keyed to the shaft 49 of the feed roller.

The rock arm 103 is pivotally supported intermediate of its ends by a bolt 114, to a yoke-shaped bracket 115, that is bolted to the adjacent side frame of the machine. The smooth curved peripheral surface 116 on the periphery of this intermittently rotating gear 109, is made of such a predetermined part of its circumference as will cause the gear to stop dead or hesitate during each of its revolutions, and as this gear drives the blank feeding roller it controls and determines the length of time the feed roller or more strictly speaking the air suction box shall stop at its blank receiving station to receive each blank from its automatic blank supplying and feeding mechanism relative to the time in which the feed roller makes its full revolution.

We have found in practice that a stop at the blank receiving station of the air suction box of the feed roller is advantageous, as it prevents blanks that are out of orderly arrangement with the line of air suction apertures of the air suction box from ever starting toward the blank gumming cylinder until it has been put into orderly alinement with the line of blank gripping air suction apertures of the air suction box of the feed roller.

The length of time that the air suction box does stop at its blank receiving station is just sufficient to allow the blanks to be fed to and its advancing edge to be placed over the air suction apertures which are under suction draft ready to receive it, and if it covers all of the air suction apertures, to grip it, then start forward with it and feed it to the gumming cylinder. If however, the advance edge of the blank does not cover all of the air suction apertures of the air suction box and even only one or a part of one is exposed to the atmosphere, the suction will be broken in the air suction box of this feed roller, and will fail to act in the air suction diaphragm, and the blank will stop at this air suction box until this particular blank is either righted into alinement so as to fully cover all of the suction apertures under it and within the scope of the area of its advancing edge portion, or else to remove it entirely from the machine, and we have provided an automatic crooked or twisted or otherwise disorderly arranged blank removing device which will be presently described, that instantly removes such blanks.

The diaphragm itself is secured to the rock arm by three stud screws, one of which 117 secures it to the adjacent side of the rock arm 103, and the other two, which extend from opposite sides of the diaphragm, are secured to the ends of two arms 118, that are projected from opposite sides of the rock arm to receive them. Consequently this diaphragm rocks with the rock arm. The stem 101 of the diaphragm is provided with a collar portion that bears against the adjacent side of the rock arm 103, while the stem extends loosely through the rock arm and terminates in a pin portion 119 that projects beyond it into engaging and disengaging relation to a swinging lever, as will be presently described.

The air chamber in the hub of the diaphragm disk is provided with an expansion spring 120 which bears against a cup portion of the air inlet nipple 89 at one end, and against the bottom of the sleeve 100 at its opposite end. This spring holds the diaphragm stem and the flexible diaphragm extended out to the limit of its outward movement, while the air suction of the air pump 79 draws the diaphragm in against the tension of the spring, and when the suction force is cut off, the spring moves the sleeve, its stem, and the diaphragm out again to their normal positions in front of the bearing side 121 of the swinging lever 122, which would then engage it if it remained there. When however the suction impulse does act on the diaphragm, the pin is drawn back out of the swinging path of the lever 122 which then swings past the pin 119. These relative positions of the bearing end of this lever 122, will be more fully explained hereinafter.

The swinging lever 122 is mounted on and secured to one end of a rock shaft 123, which is journaled in the lower ends of the breacket 115. The lower end of this lever is provided with a flat bearing surface that is slightly inclined upwardly and forwardly toward the machine, in order that it may have a squarer contact against the pin during its pushing stroke against it.

A lever 124 is secured at one end on the opposite end of the rock shaft 123; the opposite end of this lever 124 is pivotally connected to one end of a rock arm 125 by a link O¹. The opposite end of the rock arm 125 is provided with a roller 126, that engages a cam 127, that is formed on the outside surface of a spur gear 128, that is bolted to the face of a gear 129, which is secured to the shaft 18 of the blank gumming cylinder, which rotates continuously. Consequently the shaft gear drives the spur gear 128 continuously.

The rock arm 125 is pivotally secured by a pivotal bolt 130 to a lug portion 131 on the upper adjacent end of the bracket 115. The cam 127 is a raised ring member that is secured to the side of the spur gear 128, and at one point it is provided with a recess 132, into which the roller 126 of the rock arm 125 moves, being forced therein by a coiled spring 133, with which the rock shaft 123 is provided. One end of this spring is secured to the bracket and the opposite end is secured to a collar 134, that is mounted on and keyed to the rock shaft by a screw 135. This spring 133 is arranged and adapted to hold the roller end of the rock arm in continuously bearing contact with the surface of the cam 127, and to force it into its recess 132, so that this rock arm may have a positive reciprocal and continuous oscillating movement which is imparted to the rock shaft through the lever 124, and through the rock shaft 123, to the swinging oscillating lever 103, and these rock arms 125 and 122 continuously swing and oscillate regardless of the reciprocal movement of the pin end 119 of the stem 101, due to the air suction impulses of the diaphragm in drawing the pin out of the path of the swinging lever or of its forward movement into the swinging path of the lever, due to the action of the spring 120 within the diaphragm.

The pin normally stands in the path of the swinging lever's sloping end 121, but the diaphragm will always withdraw the pin out of the path of the end 121 of the swinging lever as long as blanks are fed to the suction box of the feed roller in straight proper order of alinement relative to the line of air suction apertures in the suction box of the feed roller, but the instant a blank feeds to the line of air suction apertures in the suction box and does not cover all of its air suction apertures, the suction is broken both in the air suction box and in the diaphragm, and then the spring 120 of the diaphragm throws or pushes the pin across the path of the swinging lever, which engages it and swings it along with its stroke toward the adjacent side frame 1 of the machine, which tilts the diaphragm and its rock arm, as will be presently described.

The above described movements are the regular natural actions of the diaphragm and the rock lever 103, the rock arm 125 and the cam, on the continuously rotating spur gear 128, and it affects the intermittently rotating gear 109, which is mounted loosely on the hub 49ᴬ, but which rotates the shaft 49, of the feed roller, and the feed roller itself, as follows: Whenever the diaphragm 94 receives suction force impulse action from its air pump 79, the suction box of the feed roller also receives a suction force impulse simultaneously, as they are in synchronous relation, and they always receive such an impulse with every blank that is fed straight to the suction box of the feed roller, and covers all of its air suction apertures 66, and when the diaphragm receives this suction impulse its pin is withdrawn out of the path of the swinging lever 122, and as a consequence its own lever 103 is not moved to draw the locking bolt out of its recess in the intermittently rotating idler gear 109, and consequently the locking bolt rotates with this spur gear 109, which on account of its being an idler that is loosely mounted on a hub 49ᴬ, that loosely surrounds the shaft 49 of the feed roller, does not rotate the feed roller because the hub 49ᴬ is secured to the side frame 1. Consequently the intermittently rotating gear 109 does not directly drive the feed roller 7, but it drives the locking bolt 113 around with it, which is feather-keyed to the shaft 49 of the feed roller and consequently the feed roller is rotated by the locking bolt through the medium of this intermittently rotating idler spur gear 109, and the feed roller is in this manner rotated with every blank that is fed to it in such order as to completely cover all of the air apertures of its suction box that are under the size of blanks being run through the machine, and all of those apertures that are not under the size of blank being run are tightly closed by the finger valves 93.

When however a disorderly blank is fed to the air suction apertures of the air suction box, as occasionally happens, considering the large number of blanks our machine will gum in a day, which is about fifty a minute, and the disorderly blank is out of alinement with the row of air suction apertures in the suction box enough to leave even a part of one air suction aperture at either end of it uncovered, the suction vacuum in the suction box and also simultaneously in the air suction diaphragm of the trip mechanism, is broken, as they are both operated in unison by the one air pump 79. Then the instant the air suction is broken, the diaphragm will not move and its pin is not withdrawn from the oscillating path of the swinging lever 122, and consequently the swinging lever engages it and swings it along with it, which movement causes the lower end of the rock arm 103 and also the diaphragm to move with the pin and it causes the upper end of the rock arm to move laterally away from the mutilated gear 109, and in doing so to draw the locking bolt out of the key-way or recess 108 in the side of the gear, and the hub of the locking bolt slides back on its feather-key under the pressure of the segment collar of the rock arm in its annual groove. The locking bolt 113 is now withdrawn from and free of the mutilated idler gear 109. Consequently while this gear continues to rotate, being driven by the gear 128 on the shaft of the gumming cylinder, which is rotating continuously, the feed roller's shaft 49 which is under the control of the locking bolt is stopped and consequently the feed roller is stopped, and as it will not move and feed the crooked blank, this blank is tripped up or stopped, and before it has entered the machine far enough to do any damage or cause any unusual delay, but it must be immediately either removed or squared around to cover the one or more air suction apertures it failed to cover when it was fed in a crooked condition to the suction box of the feed roller. It requires but a few seconds of time to remove crooked blanks, which will immediately start the suction box and diaphragm suction impulse in their regular operative order, the suction box gripping the blanks and the diaphragm simultaneously withdrawing its pin out of the path of the swinging lever and allowing the gear to drive the locking bolt and feed roller to make its revolution.

As before stated, our new type of blank gumming mechanism may be provided with any type or character of blank supplying and feeding mechanism that is suitable for feeding blanks to the air suction box 65, of the feed roller 7, of our blank gumming machine.

We have however invented a combined pneumatically operating blank feeding and supplying apparatus that is especially designed to fulfil every requirement in connection with supplying and feeding blanks to our blank gumming machine, and while there are many ways in which pneumatic and supply features of our new blank feeding invention may be carried out, we preferably construct and arrange it in the following manner:

To the blank-feeding end of the side frames 1 and 2 of the machine, we secure side frames 136 and 137, which two side frames form what we term the blank stacking frame. In these frames we journal in suitable bearings formed in them a shaft 138, on the opposite end portions of which gears 139 are secured. These gears mesh with gears 140 that are mounted on the lower ends of vertically disposed threaded rods 141, which are supported in lugs $O^2$ of the frame and are threaded in nut bushings 142, that are secured in recesses $O^3$, formed in the opposite end portions of a frame 143, that is slidably mounted in guideway slots 144 formed in the inside surfaces of the adjacent frames. This frame forms an integral part of a table 145, which it slidably supports between the frames. A hand wheel 146 is mounted on one end of the shaft 138 which when turned rotates the shaft and through its gears 139 and the gears 140 of the threaded rods rotates the rods in the fixed nut bushings and raises or lowers the table. This table is arranged to support a stack or pile of blanks such as our machine applies gum to one side of, for tight wrap box covering work, or to the edge of one side only for loose wrap box covering work.

Across the supporting frames 136 and 137 of the table a right and left handed threaded rod 147 is extended and journaled in said frames, one end of which extends beyond its adjacent frame and is provided with a turning crank 148. On the right and left hand threaded rod 147, double ended levers 140 and 141 are threaded to its end portions. The lower ends of these double ended levers are loosely and slidably mounted on a smooth rod 150, which extends across the frames and is journaled in them, and which acts as a horizontal guide rod for the threaded double ended levers 149. The upper ends of these double ended arms are each provided with a vertical rod 151, and these two rods project up through slots 152 formed in and through the table from its opposite side edges, and these two rods form vertical side guides for the stack of blanks on the blank holding table 145. These blank holding guides are laterally adjustable to move in unison toward or away from the center of the table by turning the crank 148 and they extend far enough above the top of the blanks to act as guides for the full height of the stack of blanks or of any part of it as they are fed to the machine.

The top of the table is flat but is tilted slightly toward the gumming machine, and a stack of the blanks $O^4$ is placed on the table and they stand slightly tilted toward the machine, owing to the tilting position of the table 145, which tends to cause them to lean against the vertically disposed bars 207, that are secured to a cross-bar 208 that is attached to the insides of the adjacent frames. This pile of blanks extends up to the air suction blank gripping mechanism, and the table is raised automatically by this blank feeding mechanism periodically as this blank feeding mechanism requires it within its operative movement. The mechanism that is connected to the table's operating mechanism that coöperates with the blank gripping and feeding mechanism to automatically feed the stack of blanks to it, is as follows:

On the end of the gear shaft 138 that extends through and beyond the side frame 2, a ratchet wheel 153 is secured, and on the outside of this ratchet wheel a hub 154 is mounted loosely on the shaft, which is provided with an arm 155 that supports a spring actuated pawl 156 which is arranged to extend in operative meshing relation to the ratchet teeth of the ratchet wheel 153, and beyond their inner edge and on the inside of the ratchet wheel a cam disk 157 is loosely mounted on the shaft 138, which has a smooth peripheral surface that is free from ratchet teeth and that is enough larger in diameter than the ratchet wheel to normally be engaged by said pawl 156 which normally rests on it. This cam disk is provided with a recess 158 in its peripheral edge that is long enough to equal the length of several of the ratchet teeth of the ratchet wheel. As the smooth edge of this disk is larger in diameter than the ratchet wheel, the pawl which is mounted in operative position on the ratchet disk will not enter into mesh with its teeth only when the recess portion of the smooth rim of the cam disk is in the reciprocal path of the pawl 156. Consequently when this cam disk is moved so that its recess 158 registers opposite to the pawl, the pawl will engage the teeth of the ratchet disk and will turn it to the extent of several teeth, and the mechanism that moves this cam disk 153 and the pawl to operate the ratchet wheel to turn the shaft 138 and thus raise and lower the table, is as follows:

A lever 159 is secured at one end to the projecting arm 155 formed on the pawl supporting hub 154, the opposite end of which extends to and is connected to one end of a rock arm 160 which is pivoted at its opposite end to the adjacent side frame 137 of the paper stacking machine. This rock arm is provided intermediate of its ends with a lug 161 to which a roller 162 is secured, that is engaged by a cam 163 that is formed on a disk 164 that is mounted on the main driving shaft 82 of the gumming machine. Consequently the pawl carrying hub is given a partial rotative movement on its supporting shaft by the cam 163 and the rock arm 160. The pawl 156 is rigidly secured to a pin 165 that extends through a lug 166 formed on the arm 155. This pin is provided with a spring 167 that is arranged to hold the pawl in resilient tension against the smooth edge disk, and in engaging relation to the ratchet toothed wheel. Consequently the table raising and lowering mechanism is driven from the machine's main driving shaft, which is driven from the power driving clutch controlled shaft that receives its power by a power driven pulley from a source of rotative power. The smoothed edge cam disk 157 is moved reciprocally on the table's operating shaft 138 in the following manner, to free the pawl so that it will engage the teeth of the ratchet wheel: A link 168 is secured at one end to it and at its opposite end it is secured to one end of a rock arm 169. This rock arm 169 is pivotally attached intermediate of its ends by a bolt 170 to the adjacent side frame 137 of the blank stacking frame, while the free end of this rock arm is provided with a roller 171. This rock arm is held in its operative position by a spring 172, which holds the lever against a pin $O^5$ and which is secured at one end to it just above its link connecting end, and at its opposite end is secured to the frame 137. The roller 171 of this rock arm is engaged intermittently by the lower end 173 of a rock arm 174, which is secured to the end of a shaft 175 that extends across and is journaled in the side frames of the blank stacking frames. This rock arm 174 and this shaft 175 form a part of the blank gripping air suction operating tubes 205 and their coöperating mechanism that operates the cam actuated ratchet and pawl raising and lowering table mechanism just described, and which is arranged and operates the ratchet and pawl mechanism as follows:

The opposite end 176 of this rock arm 174 contains an aperture in which a swiveling lug 177 is loosely secured, and the outer end of this lug is loosely and slidably mounted on one end of a rod 178, and against one end of a coiled spring 17ᴬ. The opposite end of this spring is secured to the rod 178 by a collar 179. The end of this rod 178 adjacent to the lug clip is provided with a collar nut 180 which can be adjusted to limit the lug on the rod toward its free end. The opposite end of the rod 178 is pivotally connected to one end of a rock arm 181 that is pivotally connected intermediate of its end by a bolt 182 to the side frame of the paper stacking machine. The opposite end of this rock arm 181 is provided with a roller 183 which is engaged by a cam 184 which is formed on the cam disk 164 that is mounted on the machine's main driving shaft 82. On the shaft 175 a vertically disposed crank lever 185 is secured at one end, the upper end of which is pivotally connected to one end of a link 186, the opposite end of which is pivotally connected to one end of a rock arm 187 that is mounted intermediate of its ends on a rock shaft 188, that extends across and is journaled in bearings formed in the side frames of the blank stacking frame. The opposite end of this rock arm 187 terminates in a casing member 189 that supports slidably a toothed bar 190 as will be presently described.

This rock shaft 188 extends across the blank stacking frames, and a crank lever 191 is secured at one end to it; the end of this crank lever 191 is pivotally connected to one end of a connecting rod 192, that extends toward the bed plate 193 of the machine, and its opposite end is connected to a rock arm 194 which is pivotally connected just above the bed plate 193 to the adjacent side frame 1 of the machine. The opposite end of this rock arm is provided with a roller 195, that is arranged to be engaged by a cam 186, that is formed on a disk 187 that is mounted on the machine's main driving shaft 82. This cam 187 and its rock arm 194, together with the connecting rod 192 and the lever 191, impart an oscillating movement to the rock shaft that results in a rocking sliding movement being imparted to the blank engaging pneumatically operating air suction tubes and their supporting mechanism, which are adapted to move down against the top of the stack of blanks, grip by suction the top blank of the stack of blanks, raise it up clear of the blanks below the top blanks, then move the blank that has been gripped by suction forward and carry it down and deposit it directly on top of the suction box 65 of the feed roller 7 of the gumming machine, and then release the blank which is instantly gripped by a blank presser plate 198 that presses it down against the apertures in the suction box of the feed roller. After releasing the blank at the suction box, the blank picking up and carrying and depositing suction tubes return back to the stack of blanks for another blank.

We will now describe this new, novel and reliable pneumatically operating single blank feeding mechanism:

A gear 199 is mounted on the rod shaft 188, which meshes with the toothed rack 190. This toothed rack is slidably mounted in the casing member 189, which forms a part of the lower end of the rock arm 187. Consequently the supporting casing of this toothed bar has a rocking motion that is imparted to it by the shaft 175. The gear 199 meshes in the teeth of the rock bar and the gear 199 imparts a reciprocal movement to the toothed bar independent of the rocking movement of its casing, in which it is slidably mounted. To the forward end of this toothed bar, a cross bar 200 is secured, in the opposite end portions of which slots 201 are formed. In these slots clips 202 are adjustably secured by screws 203, while the clips are slidably mounted on the cross bar. One end of these clips projects forward of the bar far enough to form supports for air tubes 204 which are secured to them preferably by being forced into them. The lower ends of these tubes are provided with short tubular members 205 that are larger in diameter than the tubes 204. These blank gripping ends of the tubes and the blank gripping tubes themselves may be of any suitable shape but are preferably in the form of circular tubes of about a half inch in diameter but may be made larger or smaller as desired, and they may be made of any suitable material. We preferably however construct them of metal.

We have preferably illustrated but two of these blank gripping, carrying and depositing sucker members, but more may be added if desired.

These air tubes have an up and down combined rocking and reciprocal movement, which owing to the rock arm and its casing and the toothed rack, results in forcing the air tube members down tightly against the surface of the top blank of the stack of blanks. Then after the tubes have been moved down against the blanks they are lifted with the blank gripped to them. Then the tubes move upwardly and forward, which results in the front or advancing edge of the blank being carried upwardly and forwardly against the edge of a couple of saw toothed scrapers 206, which are supported directly in front of and in the path of the forward or advancing edge of each blank as it is raised up by the sucker members. These saw toothed scrapers are secured to vertical bars 207 that are attached to a cross bar 208 that extends across the insides of the side frames of the blank stacker.

These saw tooth scrapers comprise block shaped members that have an upwardly and backwardly curved face, that is engaged by the advancing edge of each blank which is pushed against it, and as the blank is raised, its advancing edge scrapes, rubs, vibrates and chatters from the point of one saw tooth to the part of the next one as it is pressed over and against these scrapers. Having raised the blanks over the scrapers, the sucker members carry the blank on its forward stroke over to the sucker box of the feed roller 7 and drop it down with its advancing edge directly over the line of air suction apertures in the suction box, where it is gripped down against the surface of the air suction bar of the feed roller by the presser plate 198 which will be presently described. And if the advancing edge of this blank is in straight alinement with these air suction apertures, the blank will be instantly gripped by them and will be fed forward by them and the feed roller to the gumming cylinder; if it should be a crooked or twisted blank, and consequently out of alinement with the row of air suction apertures, it will be tripped up by the diaphragm and its coöperating mechanism, as above fully explained, and should it be tripped by the diaphragm it is instantly removed from the machine by an automatic blank removing device, which will also be presently described. The pressure plate that holds the blanks against the air suction apertures 66 of the feed roller is arranged to press the blanks down against air suction apertures 66, while the air tubes are raised up from it at the time the air suction is cut off from these tubes so as to positively and instantly release the blank from the tubes.

The free end of this presser plate is arranged to allow the advancing edge of the blanks to be passed freely and easily under it, and the plate is provided with a row of air recesses 209 that are positioned to register over the air suction apertures of the suction box of the feed roller. This plate is secured on a rock shaft 210 which is actuated to fly down and engage the blank by a spring 211 which is operatively connected to it, and also by a rock arm 212 that is mounted on the rock shaft and engages a cam 213 that is formed on a gear 214 that is mounted on the shaft 18. The cam and rock arm mechanism are timed to raise the bar high enough to allow the tubes to move a blank under it over the row or line of air suction apertures in the suction box of the feed roller, when the cam instantly releases the rock arm and the spring 211 throws the plate down on the blank and holds it down with resilient pressure. This blank gripping plate 198 is provided with air recesses that register over the air suction apertures of the air suction box of the feed roller, in order that there may be an unobstructed passageway for the atmosphere to the blank directly over the air suction apertures, and in case the blank is twisted enough out of alinement to uncover one or more of the air suction apertures so the atmosphere will have free inlet to it, so that the blank can be tripped up and be removed.

The sucker tube members thus pick up and scrape off the edges of each blank and this action loosens and frees the next blank underneath the top one, should perchance from any cause the next blank start to rise up and follow the top blank.

The operation of our automatic stack of blanks feeding and crooked blank removing apparatus is as follows:

The air tube members pick up the blanks and deliver them to the suction box of the feed roller in quick succession about fifty per minute, and the downward reciprocal rocking movement of the sucker members' supporting mechanism allows of an up and down pressure movement against the top of the stack of blanks, and the blank gripping tubes and their reciprocating bar are arranged to feed several blanks off from the top of the stack before the stack feeding mechanism is moved by it to feed the stack up within the full limit of the tubes' blank gripping up and down reciprocal movement. The blank gripping tube device does automatically engage the stack supporting table feeding mechanism just before it reaches the limit of its blank engaging and gripping movement, and moves it sufficiently to start the table's feeding mechanism to feed the table upward sufficient to bring the top of the stack of blanks within the full blank gripping movement of the air tubes, and this action of the blank gripping tubes and their supporting mechanism is accomplished as follows:

As long as the tubes are gripping and feeding blanks within the limit of their regular blank gripping movement, which for example we will say is ten blanks, its arm 176 of its rock arm 174 through the medium of its puppet 177 is reciprocated on the rod 178 against the spring 179 freely, and at the same time the cam actuated rod reciprocates freely through the puppet. As the tubes however feed the ten blanks off the top of the stack one at a time, the arm 176 of the crank arm 174 travels a little farther in the direction of the arrow, and its long arm moves closer to the pin 171 of the rock arm 169, until finally when the tenth blank is fed off of the stack the stroke of the crank arm on the spring 179 and rod 178 is of sufficient length to cause the end 173 of this crank arm at a sufficient distance to strike the roller and tilt the rock arm 169 and cause the link 168 to pull the cam 157 around on its shaft far enough to bring its recess 158 to register opposite to the pawl, which allows the pawl, which has been resting on the smooth peripheral edge of the disk 157 and has been continuously reciprocated throughout its stroke by its cam actuated rock arm 159, to drop into the recess and consequently into mesh with the ratchet teeth of the ratchet wheel, and move this ratchet wheel rotatively a distance of several teeth, and as the ratchet wheel is secured to the shaft 138 it partially rotates this shaft, which through the medium of its gears 139 and the gears 140 on the threaded rods 141 rotates these rods and as they are threadedly attached to the table, the table and the stack of blanks is raised, and this ratchet engaging and step by step turning movement of the pawl 156 is continued as long as the crank arm's lower end has stroke movement enough to strike the roller and cause the rock arm 169 to move the recess 158 of the cam 157 to register opposite to the pawl to allow it to drop into the ratchet teeth of the ratchet wheel 153.

The instant the table and its stack of blanks is raised up to the full limit of the feeding movement of the blank gripping tubes, the stroke of the lower end 173 of the crank arm is too short to strike the roller, and the cam is drawn back by the spring 172 which acts on the rock arm to cause the link 168 to push the cam 157 around on its shaft so that its recess 158 is out of the path of the pawl, which would then ride on its smooth peripheral surface. It will thus be seen that the blank gripping and feeding tubes with their rocking and reciprocal supporting bar and coöperating mechanism automatically feed the stack of blanks to the tubes as they are needed.

It is essential that in addition to holding the blank down after the air suction tubes have deposited it on the air suction apertures of the feed roller, some positive means be provided for instantly removing the crooked blanks from the feed roller, and this feature of our invention coöperates with the blank feeding movements of the air suction tubes in the following manner:

To the back of the vertical bars 207 that support the saw toothed scrapers, we secure a pair of blocks 215, in the sides of which apertures 216 are formed, that receive the opposite ends of a stem 217 on which rollers 218 are formed at short spaces apart. The rollers are larger in diameter than the rod, and they form frictional idler rollers for a set of rollers 219 that are formed on a shaft 220 that extends across and between the side frames 1 and 2 and is journaled in them. One end of this shaft extends beyond the frame and a round belt sheave 221 is secured on its end. The rollers 219 on the shaft 220 are set close enough to the idler rollers 218 to either bear against them or be close enough for them to grip and feed a blank down between them. This belt sheave is provided with a round belt 222 that extends over suitable sheaves 223 and 224 that are properly mounted on the adjacent side frame, and the belt extends from these sheaves 223 and 224 to and is mounted on a sheave 225 that is secured on a right angled stub shaft 226 that is mounted on the clutch controlled power driven shaft's supporting frame and is driven by the worm pinion and gear.

The crooked blanks are engaged by an oscillating plate 227 that is provided with projecting blades that strike the blanks and carry them down between the rollers 218 and 219, the blades of the plate being arranged to extend down between the ends of the rollers and between the stem and the shaft.

This feature of our invention we carry out in the following manner:

Upon the hub portions 228 of the feed roller 7 we mount loosely two rock arms 229, the ends of which extend toward the feed rollers 218 and 219, and to them we secure the thin metal angular shaped plate 227, which extends across the entire length of the feed roller 7 from one rock arm 229 to the other. The free lower edge of this angular plate is provided with projecting blade portions 230 which are spaced at a distance apart and are of a length that will enable them to pass between the ends of the rollers 218 and 219 and also down between the stem 217 and the shaft 220. Consequently when they strike down against a blank they fold it up and carry it directly between the rotating rollers, which instantly grip it and feed it through them, while these blades pass down between the ends of the rollers and the stem and shaft far enough to positively force the crooked blank between the rollers, which are rotating toward each other. This plate is normally held above and out of the blank feeding path of the air tubes and also out of the path of the blank presser plate, and it is thrown down against a crooked blank in the following manner:

The inner or lower ends 231 of the rock arms 229 are pivotally connected to one of the ends of a pair of connecting rods 232, the opposite ends of which are secured to one end of a crank lever 233 which is secured on a shaft 234. This shaft extends across and is journaled in both frames 1 and 2, and extends beyond the frame 1, and on its outside end a crank lever 235 is secured, the free end of which is connected by a link 236 with the upper end of a rock lever 237, which is pivoted intermediate of its length to the side frame 1. The lower end of this lever is provided with a roller 238 which engages a cam 239 that is formed on a disk 240, that is mounted on the main driving shaft 82 of the machine, which is driven by the worm gear and pinion of the power driven clutch controlled shaft 83.

This automatic blank removing mechanism operates in the following manner:

The rollers are positioned between the stack air tube blank feeding mechanism and the air suction apertures of the feed roller, and they rotate continuously at all times. The reciprocating plate also reciprocates at each cycle blank feeding movement of the machine, or in other words, it reciprocates up and down from its position out of the path of the blanks to its position between the rollers and the stem and shaft that support the rollers between the feeding movement of each blank from the stack to the feed roller. Then as the blanks feed to the feed roller, all those blanks that are in proper orderly alinement and are straight are gripped by the air suction apertures of the feed roller and are quickly fed by it to the gumming cylinder, but any and every and all blanks that happen to be fed to the air suction apertures of the feed roller in a crooked or twisted or disorderly alinement with the row of apertures in the aid suction tubes of the feed roller so as to uncover one or more of those apertures, and consequently are tripped and stopped at that point, instantly receive the downward stroke of the reciprocal movement of this plate intermediate of its ends or lengths, and it is instantly doubled up and carried by this plate down into these constantly rotating rollers, which grip it and feed it through them and discharge it from the machine, without interfering in any way, shape or manner with the regular time movements of the feeding blanks, and of the blank feeding mechanism.

The construction above described of the blank gumming cylinder, has described the construction we employ for coating or covering the entire surface of one side of the blank with gum, glue or other adhesive, as shown in Fig. 31, the gummed surface being indicated by the entire surface of the blank being shaded.

In preparing blanks to be used for covering boxes in a manner known as loose-wrapped work, the blanks, instead of being entirely covered on one side with the adhesive substance, are gummed only on a narrow margin of both of their sides and end edges, such gummed blanks being adapted to extend inside of the box and are folded down on the inner surface of a box adjacent to its upper edge.

In Fig. 32 of the drawing we have illustrated a blank with the gummed edges shaded on the edges necessary for loose-wrapping purposes. These gummed edges are indicated by the shading along the side and end edges only of the blank B, shown in Fig. 32, and in Figs. 27 to 30 inclusive, where we have illustrated the construction of a blank gumming cylinder especially designed to gum blanks for this character of box covering work. The circumferential surface and shell $B^1$ of the cylinder $B^2$ is perforated with apertures $B^3$ which are threaded as shown, and in these perforations screw driver screws $B^4$ are threaded, for the purpose of adjustably retaining narrow strips $B^5$ and $B^6$ of any suitable material, preferably strips of metal. The strip $B^5$ extends in the direction of the axis of the cylinder and is adjustably held in place by means of clamping dogs $B^7$ arranged on opposite sides of it and held in place by the screws $B^4$, which are passed through slots $B^8$ formed in the dogs. The edges of the dogs adjacent the said strip are beveled to conform to the beveled edges of the strips. The strip $B^5$ is adapted to apply the adhesive gum to the narrow rear end edge $b$ of the blank (see Fig. 32). It is essential that this strip $B^5$ should be adjustable in order that it may be properly arranged to conform to the requirements of blanks of different sizes.

For gumming the area $b^1$ on the advancing edge of the blank, the outer cylindrical curved surface of the segment bar $B^9$ is utilized, this outer extremity being radially extended beyond the normal peripheral surface of the cylinder, to and even with the gumming exterior surface of the strips $B^5$ and $B^6$.

In order to gum the surfaces $b^2$ at the opposite sides of the blank, strips $B^6$ are properly positioned, being curved circumferentially to conform to the curvature of the outer face of the cylinder. These strips $B^6$ are also held in place by adjustable dogs $B^9$, which are secured to the cylinder by screws which after passing loosely through slots $B^8$ in the dogs thread into the cylinder. These strips $B^9$ are consequently adjustable in order that their positions may be varied to suit the size of blanks being gummed, for loose wrap work.

In order to hold the blank in its proper position upon the cylinder against accidental creeping movement while changing the position of the segment bar to free and expose the gummed advancing edge of the blank, we apply to the central portion of the cylinder along the edge of the gap that is normally engaged by the segment, a raised strip C, which however is of less height than the gumming strips $B^5$ and $B^6$, as it does not receive any gum on its surface, and we apply a resilient pressure to the blank when it rests on the surface of this strip that holds it against displacement when the segment moves away from the advancing edge of the blank under the influence of the crank levers 44 and 45 and the cam 47. This resilient pressure is applied to the blank on the surface of the strip C, as follows:

A rock shaft $C^1$ is journaled in the framework of the machine as shown at $C^2$, and intermediate between the ends of this shaft, a crank arm $C^3$ is made fast, the outer end of which carries a roller $C^4$. A coiled spring $C^5$ surrounds the shaft, having one extremity secured to the frame as shown at $C^6$ and its opposite end connected to an adjustable collar $C^7$, which is held in place on the rock shaft $C^1$ by a set screw $C^8$. This spring normally holds the roller $C^4$ against the surface of the strip C while the rock arm $C^9$ and cam mechanism normally hold the roller away and above this strip and also above and out of contact with the gumming strip $B^5$, so that this roller does not touch anything except the ungummed surface of the blank and the strip C. This rock arm and cam that hold the roller away from the cylinder are arranged as follows: One extremity of the shaft $C^1$ beyond the frame is equipped with a crank arm $C^9$, its outer extremity carrying a roller D lying in the path of a cam recess $D^1$, formed in a disk $D^2$ that is secured on the shaft $D^3$ of the gumming cylinder at the side of its driving gear $D^4$.

In gumming blanks for loose wrap work, in addition to gumming the edge portions of blanks as shown and described, it materially assists in wrapping the blanks in the corners of boxes especially when some kinds and characters of paper are used for the blanks, if a small additional area of surface $b^3$ is gummed at the four corners of the blank as shown in the view of the loose wrap blank B, shown in Fig. 32, and while we may not always care to gum these corners, yet it will sometimes be an advantage to do so, and we consequently have provided the loose wrap with the necessary strips $b^4$ to distribute a coat of gum on the blank at these corners. These strips are similar in height to those that distribute the gum to the edge portions of the loose wrap blanks, and they are made of a size in length and width to gum as much or as little of these four corners $b^3$ over and in addition to the regular width of the gummed marginal edge as is desired, and they are secured on the surface of the cylinder by dogs and screws the same as the other strips. A pair of these additional corner gumming strips $b^4$ is positioned on the cylinder even with the advancing edge $D^5$ of the gap $D^6$, and consequently even with the edge $D^7$ of the segment that normally bears against the advancing edge of the gap, as the cylinder rotates, and another pair of these corner gumming strips is located in a position on the cylinder to gum the opposite end corners of the size blanks being run through the machine, and both of these sets of strips would be placed directly close up to the segment and the strips so as to distribute gum wholly over the corners of the blank without leaving an ungummed space between the strip $B^5$ and $b^4$. The opposite edges of the blank are preferably gummed only along their central portions, their corners being preferably left blank, as shown in the view Fig. 32 of the loose wrap blank B.

When the time comes to move the surface of the segment $B^9$ from under the gummed edge of the blank, the cam $D^2$ suddenly releases the crank arm $C^9$ which drops into the recess $D^1$ in the cam $D^2$ and which drop or release movement of the rock arm permits the spring $C^5$ to throw the roller $C^4$ with resilient pressure against and hold it against the blank and the surface of the ungummed strip C, which action of the roller grips the blank to the ungummed surface of this strip C as it rolls over it, due to the rotative movement of the gumming cylinder, which rotates in the direction of the arrow $a$, while at the same time the segment draws away from the gummed edge of the blank faster than the cylinder rotates and thus leaves the advancing edge of the blank in the gap, where it is instantly gripped by the blank gripping finger pickers of the conveyer the same as the blanks are that are gummed all over by the gumming cylinder 6, which gums the whole surface of one side of blanks that are to be used for tight-wrap box covering work, while this loose wrap blank gumming cylinder gums only the edge portions of one side of the blanks.

We have now described a complete and continuous line of action of each blank from the time it is first negotiated in its stack pile until it is coated with gum, and we will now describe the gummed blank tempering and transmission and discharging mechanism.

Adjacent to the blank gumming cylinder 6, the cylinder 8 is rotatively mounted on a shaft 241 that is rotatively journaled in suitable bearings 242 in the side frames 1 and 2 of the machine. This cylinder we term the transmission cylinder.

The shaft 241 projects beyond the side frame 1 and a gear 243 is secured to it. This gear is a spur gear having a blank peripheral portion $x$ equal in extent to the circular pitch of several of its teeth, and it is driven by the gear 129 that is secured to the shaft of the gumming cylinder. This gumming cylinder shaft's gear 129 is also a spur gear and it has a blank peripheral portion equal in extent to the circular pitch of several teeth. This spur gear 129 is of exactly the same diameter and the same pitch, and has a smooth blank portion of exactly the same length, as the gear 128, the gear 128 being secured to the side of the gear 129. Consequently these two blank places come directly in alinement, and only one is shown, which is the blank portion $x$.

These coöperating blank portions $x$ and $x^1$ impart an intermittent or stop movement in each rotative revolution of the spur gear 243 and of the transmission cylinder 8. This transmission cylinder is a hollow cylinder and is provided with a large gap in its peripheral surface which extends across it from end to end. This transmission cylinder rotatively supports coöperatively with a pair of sprocket wheels 244 which are mounted on its shaft at the opposite ends of the cylinder, an endless conveyer belt which is provided with cross bars 245 and 246, that are spaced at a distance apart that is a little greater than the larger size blanks that are to be run through the machine, each cross bar of which enters the gap in this cylinder. The endless conveyer comprises a pair of endless chains 247 mounted on sprocket wheels and cross bars extending across from one chain to the other and connected to them, and sheets 248 of a water absorbing fabric secured between the cross bars at close but predetermined distances apart, the sheets of fabric being larger than the largest blanks the machine will gum. The conveyer also comprises means for picking up at about the longitudinal center of the transmission cylinder which we term its blank receiving station, and conveying in a straight horizontal line over guide rails 249, the blanks while they are resting on the canvas aprons, and carrying them to the rear end turning point of the conveyer, which extends over sprocket wheels 250, and the blanks are released at this turning point by mechanism that opens the blank gripping fingers, and just before the blank gripping fingers are opened the conveyer stops and the blank is then gripped by air suction tubes, and instantly afterward the grippers are opened and the blanks are removed from the conveyer, and the point in the traveling movement of the conveyer where it stops and the blank is removed from it we term the blank releasing station. The conveyer is stopped during each revolution of its transmission cylinder 8 by the intermittently rotating spur gear that is secured to the shaft 241 that supports the transmission cylinder 8 and that is driven by the continuously rotating spur gear 129 that is secured on the shaft of the gumming cylinder. Consequently the conveyer stops at its blank releasing station for only a few seconds once in each revolution of the gumming cylinder and of the transmission cylinder, as will be more fully described hereinafter. The supporting members of the conveyer are two block link type of chains 247 that are of even length and are mounted on the sprocket wheels 244 at its blank receiving end, and on sprocket wheels 250 at its discharge end. These chains are supported and run on guide rails that are secured to the side frames of the machine by bolts 251. The bottoms of these chains extend downwardly and forwardly from the sprocket wheels 244 and 250 and around sprocket wheels 252 which are mounted in vertically adjustable bearings 253 which may be of any suitable construction, and from these wheels they extend up over idle sprocket wheels 254 to the transmission cylinder, and its forward end supporting sprocket wheels 244. These two chains are connected together by the cross bars 245 and 246 of iron or other suitable material, which are provided with end flanges 254 that are secured to the adjacent sides of the link members of the chain. To the bar 246 is secured one end of a sheet of water absorbing fabric 248, which may be of any suitable material. We preferably use however sheets or aprons of canvas wrapped around and sewed or otherwise secured around or to the bar. The bar 245 supports the opposite end of the fabric or canvas apron, which is fastened to it by a cleat 255 and by screws 256 that extend through the cleat into the bar and clamp the apron between the cleat and the bar. On the opposite side of the bar 245 from the belt a rod 257 is journaled in clips 258 that are secured to the side of the bar. One of these clips 258 is provided with a lug that forms a bearing for a rock arm pawl 259 which engages a ratchet tooth that is formed on a ratchet wheel 260 that is secured on the rod 257. This pawl is provided with a side stem 261 that extends through the lug 262 of the clip and on its end a coiled tension spring 263 is placed and is arranged and adapted to hold the pawl in engaging relation to the ratchet tooth of the wheel 260. The lower end of this rock arm pawl is provided with a roller 264 that is arranged and adapted to engage a cam 265 that is formed on the end of a fixed link member 266 that is mounted loosely on the shaft 241 of the cylinder. This cam provided link member is bolted at its opposite end from its cam to the adjacent side frame of the machine. The opposite end of this rod 257 is provided with a segment of a gear 267 that is mounted on and secured to it. This segment of a gear engages, while the endless conveyer belt is standing still, a set of gear teeth 268 that are formed on the edge of a lever 269 that is mounted in the end of a stud pin 270 that supports one of the sprocket wheels 250, upon which the discharging end of the conveyer belt is mounted. This toothed lever is positioned only on one side of the machine, however, while a similar sprocket wheel is mounted on a similar stud pin 271 on the opposite side of the machine, both stud pins being secured to the inside surfaces of the side frames 1 and 2 of the machine. The rod 257 on the cross bar 245 of the endless conveyer, is also provided with a plurality of finger pickers 41. These are secured to the rod to stand with their flat ends 41ᴬ directly against the edge of the cross bar 245 upon which their shaft 257 is mounted. A sufficient number of pickers is used to tightly clamp the edges of the blanks against the edges of the bars 245, and they are actuated by a coiled spring 272 which is mounted on the rod 257 and is arranged and adapted to normally hold the pickers under constant resilient tension against the edge of the bar 245. These picker fingers are locked in their open position by the pawl 259 engaging the ratchet tooth of the wheel 260 when the pickers are thrown open by the gear segment 267 on the rod striking the toothed segment of the lever 269 at the discharging point of each blank from the conveyer.

When the pickers grip and clamp a blank as their edges are exposed on the gumming cylinder, they peel it off in the direction in which it would naturally curl up when first removed from the gumming cylinder, and they are enabled to do this, as both cylinders travel at the same speed, and their adjacent surfaces in the same upward direction, and consequently although neither the transmission cylinder nor the conveyer stops for the pickers to grip the edge of each blank, the transmission cylinder leads and peels each blank off of the gumming cylinder at the same natural traveling rotative movement that is given to it by the gumming cylinder, and as the pickers carry each blank up over the transmission cylinder, it lays each blank out flat on the adjacent canvas apron, which is saturated with water and which, as it is conveyed along, wets and soaks it to a limpid or as it is termed a tempered condition, which means that both sides of the blank are in the same moistened condition and that the blank will not curl up in either direction but will remain in a flat straightened out position.

When the segment toothed lever 269 at the discharge end of the conveyer, is engaged by the segment toothed wheel of the rod of the bar 245, the picker fingers fly open from the bar and release the blank, which is then picked up by pneumatic sucker tubes, which lift them up and carry them forward to the discharging table of the machine.

In order to prevent the chains of the conveyer belt from jumping off from the sprocket wheels when the roller 264 strikes against the cam 265 as the chains travel along, and the picker fingers are freed by the cam 265 and strike violently the bar 245 as they grip the edge of each blank, which action of the roller striking the cam and of the picker fingers striking the bar takes place almost simultaneously, we provide a pair of guide plates 273, placing them on opposite sides of the machine, and arranging them to register close to the edge of the sprocket wheels 244 so as to prevent the chains from jumping off from the teeth thereof.

In order however that the picker fingers shall be positively actuated to fly open to release blanks at the discharge end of the conveyer, the segment toothed lever is arranged to be moved to partially rotate the segment gear on the rod 257 of the bar 245 quickly, in each cycle movement of gumming and transmission cylinders, and in order to accomplish this, it is necessary that the segment toothed lever be driven from the main driving shaft of the machine. For this purpose a sprocket wheel 274 is mounted on the main driving shaft of the machine, upon which a sprocket chain 275 is mounted that extends to and drives a sprocket wheel 276 that is mounted on a shaft 82ᴬ that is journaled in bearings formed in side frames 277 and 278 that are preferably made independent of the side frames 1 and 2 of the main portion of the machine, although if desired the two sets of frames as well as those of the blank stacker and feeder may be made in one piece for each side and with a bed plate between them on which the air pumps 79 and 279 and 280, 281 and 282 are placed and secured, although these air pumps may be positioned away from the machine if desired or the air suction tubes and apertures may be connected to a general air suction plant installed in the factory where the gumming machine is used.

Upon the shaft 82ᴬ a cam 283 is mounted, which engages a roller 284 that is mounted on one end of a rock arm 285, the opposite end of which is connected to one end of a connecting rod 286. This rock arm 285 is pivotally connected intermediate of its ends to the side frame 277 by a bolt 287. The opposite end of the connecting rod is pivotally connected to one end of a rock arm 288, the hub portion of which is mounted on a stud pin 289 that is secured to the adjacent side frame of the machine. The opposite end of the rock arm is pivotally connected to one end of a link 290, the opposite end of which is pivotally secured to the segment toothed lever 269. Consequently the main driving shaft of the machine drives through the medium of the chain 275, the cam 283, the rock arm 285, connecting rod 286, the rock arm 288, and the link 290, the segment toothed lever 269 to open the finger pickers and release each blank, and just prior to this the conveyer and the transmission cylinder are stopped through the engagement of the blank toothed portions $x$ and $x^1$ of the spur gears 129 and 243, which come together and stop the transmission cylinder for a few seconds, while the blank on the apron at the releasing station of the conveyer is gripped and lifted and removed by the air suction blank advancing tubes, as will be presently explained.

Each one of the fabric aprons or panels or sheets of canvas of the conveyer belt is positioned separately and independent of the others, and they are positioned at such a relative distance apart as will allow them to meet and receive each blank as it is grabbed by the picker fingers, and each one of these sheets of canvas is moistened by water in some form as it travels along the under side portion of the conveyer.

There are a number of ways in which water in some form can be imparted to each of these sheets of canvas. We preferably however carry out this feature of our invention in the following manner:

Between the side frames we place and support a dish 291 by any suitable means, and in the dish we place a wick 292 which is arranged to extend over the edge of the dish and to bear against the surface of the transmission cylinder, and the capillary and absorbent action of the water on the wick feeds the water through the wick to its outside looped end which feeds off from the wick onto the surface of the cylinder and keeps its surface wet, as a wick should be used that is wide enough to keep enough of the surface of the transmission cylinder wet to moisten the full width of the canvas, or at least enough of it to moisten the full width of the size of blanks being run through the machine.

Then as the conveyer belt travels rotatively along each fabric or canvas panel when it reaches the transmission cylinder and travels around it is wrapped tightly against its circumferential surface, and is thus moistened on its under side from that on which it receives the blanks from the gumming cylinder, and each blank as it is grabbed by the finger pickers is peeled off of the gumming cylinder and is rolled out flat against the moistened surface of a moistened canvas panel. Consequently by the time each blank reaches the end of its rearward travel, it is in a flat limpid tempered condition.

Figures 37, 38:
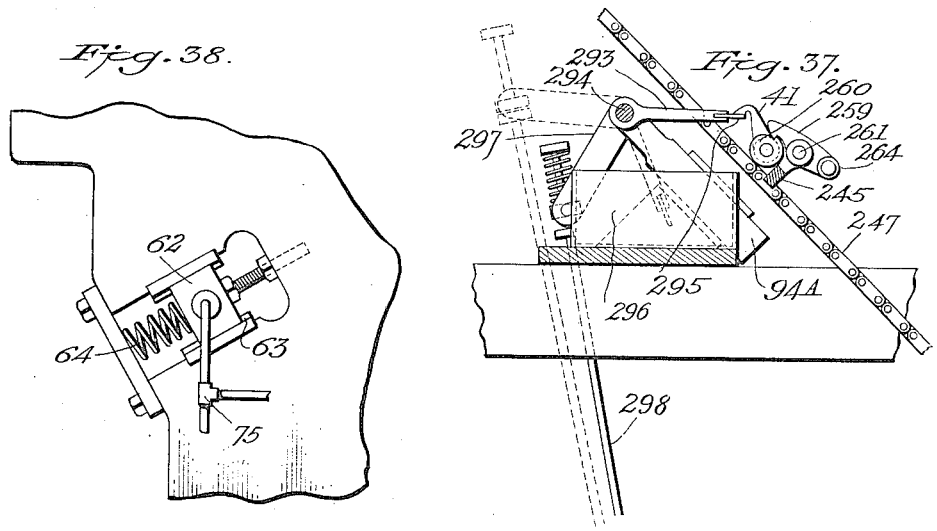
Fig. 37, is a side view illustrating the mechanism for cleansing the grippers.
Fig. 38, is a side view illustrating a modification in the bearing for the feed cylinder.

It is necessary that a mechanism be employed for cleaning or wiping off the blank engaging faces of the blank gripping finger pickers, between each of their blank gripping, carrying and releasing operations, and we preferably carry out this feature of our invention as follows:

A plurality of arms 293 are mounted on a rock shaft 294 which is journaled in adjustable frames 94$^A$ on the side frame. The free ends of these arms are provided with flexible pads or wipers 295 which normally are in contact with cleansing liquid contained in a pan 296. The rock shaft is equipped at one end with a crank arm 297 which is pivotally connected with one end of a rod 298, whose opposite end is connected with the upper end of a lever 299 which is fulcrumed on the frame at its lower end. This lever is actuated to swing the wipers into operative position by means of a spring 94$^B$, one end of which is connected with the upper end of the lever, while its opposite end is connected with the adjacent side frame, as shown. When in its normal position, the cam 187 holds the crank arm in the position shown in dotted lines in Fig. 37, and the wiper arms 293 in the corresponding position, or that shown by dotted lines in Fig. 37. However, when performing the finger-cleansing function, a cam projection of the cam disk 187 releases an anti-frictional roller 300 carried by the lever 299, and the spring 94$^B$ actuates the said lever to cause the rod 298 to move in the direction of the arrow (see Fig. 1), whereby the flexible cleansing extremities of the wiper arms are brought into wiping contact with the gripping surfaces of the fingers 41 of one set of gripping mechanism, which cleanses the blank engaging faces of the fingers of their gummed or sticky condition. As soon as this has occurred, the cam projection of the cam wheel 187 moves into engagement with the roller 300 of the lever 299 and rocks the same to move the rod 298 in the direction opposite that indicated by the arrow, which returns the arms 293 to their normal position, whereby their flexible members 295 are again returned to the cleansing liquid in the pan. This cleansing operation of the fingers takes place during the stop period in the travel of the conveyer.

The transmission cylinder receives the intermittent rotative movement from the gumming cylinder, through the medium of the gears 129 and 243, as has been previously explained. The gumming cylinder as well as the gum distributing roll and the gum supplying roll are all driven from the main driving shaft of the gumming machine, by the following arrangement of power transmitting members:

The main driving shaft 82 projects beyond the side frame 2, and a sprocket wheel 301 is secured to its outer end, and a sprocket chain 302 extends from this wheel 301 to a sprocket pinion 303 that is mounted on a stud 304 that is mounted in the side frame. A gear pinion 305 is mounted on this stud at the side of the sprocket wheel 303, which meshes into the gear 214 on the shaft 18 of the gumming cylinder. The gear 214 meshes with a gear 306 on the shaft of the gum distributing roll 5, and on the opposite end of the shaft of the gum distributing roll is mounted a small gear 307 which meshes with a gear 308 of larger diameter that is mounted on the shaft of the gum supplying roller 4, which owing to its gear 308 being larger than the gear 307 on the distributing roller, rotates slower than the gum distributing roll, which difference in speeds between these two rolls tends to reduce the amount of gum feeding from the gum supplying roll onto the gum distributing roll, while at the same time allowing the gum supplying roll to keep an ample supply of gum at its intersecting point with the gum distributing roll, and the thickness of the coat of gum flowing from the gum supplying roll is as above stated regulated by the adjustment of the set screws 14 to increase or diminish the pressure of the gum supplying roll against the gum distributing roll.

The entire moving mechanism of each blank is thus driven from the main driving shaft 82 from the time it leaves the stack of blanks to its releasing point at the rear end of the conveyer, where it is again gripped by air suction tubes and is lifted clear of the conveyer and is shot quickly ahead onto a table in position to be again gripped and fed to a box covering machine. This last movement of the blank after it is released by the finger pickers will now be described.

The air suction tubes 309 that grab and lift the blank at their finger picker releasing station are supported in clips 310 that are slidably mounted on a cross bar 311 that extends across the machine and is secured at one end to a reciprocating block 312. The cross bar is provided with slots 313 and the clips are secured in adjusted positions on this bar in these slots by cap screws 314 which are arranged to project through the slots and clamp the clips to the cross bar 311. The clips project forward from the bar and are provided with lug portions in which the air suction tubes 309 are seceured to stand in vertical planes, and they are provided with springs 315 and collars 316 that enable them to bear with a yielding pressure against the blanks. We illustrate but two of these air suction tubes, but more may be used if desired.

The lower ends of these tubes are arranged to rest directly on the blanks, while their upper ends are connected to tubes 317 that extend to an air pump 280 which is secured to the bed plate of the machine. The block 312 to which this air tube supporting cross bar 311 is secured is reciprocally mounted on a horizontally arranged guide bar 318, which is fixed to the upper end of a vertically arranged reciprocating bar 319 that is slidably mounted in cleats 320 that are secured to the adjacent side frame of the machine, and this guide bar and the vertically arranged bar have a short vertical movement which is operated by a connecting rod 321 that is pivotally attached at one end to the lower end of the vertically reciprocating bar 319 and at its opposite end is secured to a lever 322 that is rigidly secured upon the adjacent end of a rock shaft 323 that is mounted in the side frames 277 and 278 of the machine. Rigidly mounted on this shaft 323 is a lever 324, the opposite end of which is provided with a roller 325 that is arranged to engage a cam 326 that is formed on the cam disk 283 which is secured on the shaft 82ᴬ.

A connecting rod 327 is pivotally connected at one end to the reciprocating block 312 and at its opposite end it is pivotally secured to the upper end of a vertically disposed rock arm 328, which is pivotally secured adjacent to its lower end by a bolt to the adjacent side of the side frame 278 of the machine. The lower end of this rock arm is provided with a roller 329 which is arranged to engage a cam surface formed on a cam disk 330 which is mounted on the shaft 82ᴬ. When a blank arrives at its releasing station, the guide bar, the cam 326 and the rock arm 322 instantly cause the vertically reciprocating bar 319 and the horizontal guid bar 318 to instantly drop, and in doing so the inlet apertures of the air suction tubes 309 drop down on top of and against the advance edge of the blank and an air suction impulse grips the blank to the tubes 309. The next instant the horizontal guide bar 318 is raised up to the top of the upward stroke of the vertical bar's vertical movement by the cam 326 and rock arm 322 and the connecting rod 321, which upward movement lifts the air suction tubes and the blank enough above the conveyer belt to allow the blank to clear the same.

The next instant the air tubes and the blank and the block are shot forward on the horizontal guide bar 318 by the rock arm 328 and cam 330 and the connecting rod 327 over onto the top of a flat thin table portion 331, which may be made of any suitable material or metal, but which consists of a flat smooth sheet of aluminum. The instant the air suction tubes arrive at their blank dropping station on this table, the cam 326 and rock arm 322 cause the vertical reciprocating lever to drop and the horizontal guide bar 318 and the air suction tubes 309 to drop with the blank and deposit it on the front edge of the table 331 over a straight row of air suction apertures 332 that extend transversely across the table along and underneath the edge portion of the blank where it is deposited by the air suction tubes 309, the forward stroke of the reciprocal movement of which is so relatively arranged with the table and its row of air suction apertures that air suction tubes drop and press the advance edge of the blank directly on top of and against the air suction apertures when the air suction impulse of the air suction tubes is broken by the reverse movement of the air pump 280, which is operated by the cam 80 and lever mechanism 80^A and 80^B, to operatively create a suction impulse in the tubes at the instant a blank is released by the picker fingers and to break this impulse at the instant the air tubes deposit the blank on top of the air suction apertures of the table.

Then instantly after the air tubes 309 have deposited the blank, they are again lifted by the cam 326 and rock arm 322 and are then instantly returned on their backward stroke, and when they arrive at their starting point they are ready to drop down onto another blank at the conveyer finger pickers' blank releasing station.

The blank is now deposited on the table and is held there by the air suction apertures, but it still has one more forward movement to make to place it in position to be discharged entirely from the mechanism of our gumming machine.

This last movement is necessary to move the gummed and tempered blanks quickly into a position in which they can be quickly gripped by air suction device and shot directly onto the platen of a box covering machine. It is also necessary in order to provide means by which blanks of different sizes may be moved different distances in order to connect in proper order and time with the feed movements of the box covering machine with which our gumming machine is connected, it being understood that blanks are only gummed in our machine when they are to be fed to and used immediately to cover boxes in a box covering machine. This last forward movement is effected by bodily shooting the table upon which the blank has been deposited by the air suction tubes and with the blank upon it forward a predetermined distance. To accomplish this, the table is secured along its sides to tubes 333 which are slidingly mounted within tubes 334 that are clamped to blocks 335 which are secured to the side frames 277 and 278 of the machine. The forward ends of these tubes 333, rest on rollers 336 that are secured to the ends of brackets 337 that are attached to the rear edges of the side frames. The front edge portion of the table is secured at its center to the meeting ends of the folding and opening members 338 of lazy tongs device, the rear ends of which are connected to a pair of nut-blocks 339 that are threadedly mounted on right and left handed threaded portions 340 and 341 of a small shaft 342 which is journaled in bearings formed in the side frames of the machine. One end of this threaded shaft extends beyond the frame 277 and upon its end a gear 343 is secured, which meshes with a vertical rack bar 344 that is slidably mounted in cleats 345 that are secured to the adjacent side frame of the machine. A sliding block 346 is mounted on the rack bar 344 which operates this rack bar by engaging two collars 347 and 348, the lower collar 348 being fixed and positioned so that the downward movement of the block strikes it and moves it to draw the table back to its normal position and close up the lazy tongs. The upper collar is adjustable in a slot 349 formed in the rack bar, by means of a screw 350, and is set to let the table and the lazy tongs move any part of their full reciprocal stroke desired by the operator. This is accomplished in this manner: As the block slides on the rack bar it does not start to raise the rack bar until it strikes the collar 347 and if the collar is down to the bottom of the slot the rack bar will be raised high enough to rotate the pinion to move the table and its lazy tongs to the full extent of the reciprocal throw movement of the lazy tongs, but if the collar 347 is set say at one-half of the length of the slot 349 the block would move up until it struck it without raising the rack bar, and the table would be moved only one-half of its reciprocal throw movement. This adjustment is made to allow the throw of the table to be set to bring the centers of the smaller blanks and also of the larger blanks at the same relative distance from the center of the platen of the box covering machine to which our gumming machine may be delivering gummed blanks, as will be explained hereinafter.

The sliding block is reciprocated by a connecting rod 351 which is pivotally connected to it at one end and at its opposite end is connected to one end of a lever 352 that is provided with a hub 353 that is pivotally connected to the side frame of the machine by a stud bolt. This stud bolt passes through the frame 277 and on the opposite end one end of a crank arm 254 is secured, the opposite end of which is engaged by a cam 255 formed on the cam disk 283 that is mounted on the shaft 82^A. Consequently this cam and the levers 354, 352 and 351 and the sliding block 346 and the rack bar 344 rotate the pinion 343 and the threaded shaft 342 that draws the nut-blocks 339 together on the shaft and expands the lazy tongs to move the table quickly outward or moves them outward to draw the table back to its normal blank receiving position. The front edge of the table is notched with recesses 356 and the suction air device that takes the blank from the table is arranged with air suction tubes that are adapted to fit into them so that the air suction apertures of each will be in alinement with each other.

In the present state of the art of making paste-board boxes, it is essential that the finishing blanks which are made from finely calendered and glazed or otherwise highly finished surfaced papers and other suitable materials, be instantly fed as fast as each blank receives its coat of gum, and while its coat of gum is still in the very best degree of its proper consistency and adhesiveness, directly to and at the same time be centrally positioned on the blank and box receiving platen of a box wrapping or covering machine. Up to the present time however, this work of transferring freshly gummed blanks in a gumming machine of any character to the platen of a box wrapping or covering machine, has been done by hand, and it requires two operators to do it, one operator to take the blanks from the gumming machine and place them in a position where the operator at the box wrapping machine can readily pick them up one by one and place them centrally on the platen of the box wrapping or covering machine and hold them there until boxes are moved against them. This manual method of transferring the gummed blanks to the platen is slow, and results in occasional misplacement of the blanks, with the consequent improperly covered or wrapped box, which has to either be patched by hand or thrown away.

This manual method of transferring the freshly gummed blanks to the platen of the box wrapping or covering machine, cannot be used with our gumming machine, as its capacity in turning out the freshly gummed and tempered blanks is so great that manual labor could not work fast enough to successfully take them from our delivery table and place them as they should be placed on the platen, without so large a number of irregular and unsatisfactorily wrapped boxes resulting as to frequently clog and stop the wrapping machine, which would necessitate the stopping or slowing down of the gumming machine to such an extent as to greatly reduce its regular output.

Consequently we have provided means by which our freshly gummed and tempered blanks are delivered by our blank advancing, discharging, and delivering table directly over and are held in their centralized box receiving position until the mechanism of the box wrapping machine moves a box directly in contact with its gummed surface and the wrapping machine has taken full possession of the blank.

There are a number of ways in which this feature of our invention may be constructed, arranged and applied to effect the desired result. We preferably however carry out this feature of our invention in the following manner:

To the bed plate 193, adjacent to the rear side frames 277 and 278 of the machine, we secure an air pump 282 which is arranged and adapted to furnish an air suction impulse force to a blank receiving, gripping and releasing nozzle that acts coöperatively with the air suction apertures of the suction box of the table 331 to receive, grip and hold to the blanks when the table has advanced them to the limit of its forward delivery movement, and has released them so that when the table moves backward on the rearward stroke of its reciprocal movement the blank is held by this blank receiving air suction gripping nozzle in its proper centralized position directly over and resting on the platen 358 of a box wrapping or covering machine, which being in operation feeds a box on top of it and manipulates it to cover the box. This box wrapping or covering machine may be of any type used in paste-board box covering trade, and neither the machine nor its platen forms any part of our invention, but it is essential that this blank receiving nozzle or some other equally effective blank gripping and holding device be mounted on the box wrapping or covering machine to receive and hold the delivered and discharged gummed and tempered blanks as they are fed to it.

Our blank discharging and delivering table makes an instantaneous interlocking blank delivering and receiving connection with this blank receiving nozzle, which with the air pump 282 is constructed and arranged as follows:

This air pump like all of the other air suction producing pumps on the machine consists of a cylinder in which a piston is reciprocally and operatively mounted to produce an air suction impulse force. The outer end of this piston is secured to one end of a rock-arm 359, the opposite end of which is secured on a shaft 360, that extends across between the frames 277 and 278 and is journaled in them. This rock-arm is provided with a roller 361 that engages a cam 362 that is formed on a disk 363 that is secured on the auxiliary driving shaft 82$^A$ which as it is rotated by the main driving shaft 82 of the machine through the medium of the sprocket chain 275 and its supporting wheels actuates the rock-arm to manipulate the piston of the air pump to produce the suction force necessary to successfully operate the blank receiving and gripping nozzle which we arrange to oscillate to and from the table.

The cylinder of the air pump is provided with an air inlet nipple 364 and also with an air escape aperture 365. One end of an air tube 366 is connected to the cylinder inlet nipple 364, which extends part way from the cylinder toward the oscillating nozzle in the form of a metal tube, which connects with a section of flexible tube 367 that connects to the air inlet nipple 368 of the oscillating nozzle's air supplying tubular member 369, which is secured to the box wrapping machine in such relative position to its blank receiving platen 358 as to enable the nozzle to receive, grip by air suction, and hold each blank as it is delivered to it by the table until the wrapping machine takes control of it, which is instantly after the table moves backward from the receiving nozzle.

It is necessary in order to make proper blank delivering and receiving connection with the oscillating nozzle and the platen of the wrapping machine that our gumming machine be so positioned relative to it that the blank discharging and delivering table move directly and centrally over and close to the top of the platen 358 of the box wrapping machine, and we have so arranged and positioned our gumming machine that its blank delivering table reciprocates directly over and close to and with the center of its width in line with the center of the width of the platen of the box wrapping machine, and in order that our gumming machine may gum and deliver blanks to the box wrapping machine in synchronous unison with the box wrapping cycle movement of the wrapping machine, we drive the box wrapping machine from the gumming machine by a sprocket chain, which we do not illustrate but which is driven from the clutch controlled power driven shaft of our gumming machine. Consequently the blank gumming and delivering movement of the blanks at the end of the blank discharging and delivering table, is timed accurately with the blank receiving and box engaging movement of the wrapping machine; consequently the operation of gumming, delivering and box wrapping with our gummed blanks is automatic, successive and continuous, as long as the wrapping machine is in operation, and it only remains to so time the blank gripping air suction and releasing mechanism of the oscillating nozzle that the blanks will be instantly gripped when the table is at the limit of its forward stroke, where they will be held until the wrapping machine takes control of them, and then be instantly released in the following manner from the gumming machine:

A bar 370 is attached by any suitable means to the opposite side of the box wrapping machine, from the side our gumming machine is positioned on, and on this bar adjustable sliding journal blocks 371 are secured by cap screws 372. These blocks have extending lug portions 373 that are provided with slots 374 through which the cap screws 372 extend and are threaded into the bar 370. This bar is positioned close enough to the platen 358 of the box wrapping machine to enable the blocks 371 to be adjustably set in different positions to bring the largest and smallest sizes of blanks the machine will gum centrally of the platen.

These journal blocks support the opposite ends of the oscillating air suction nozzle, which comprises a tubular member or tube 375 that extends between and into the blocks and is rotatively mounted in them to partially rotate or oscillate. The opposite ends of this tube 375 are closed and it is provided with an inlet nipple portion 368 adjacent to its outer end, which extends downwardly from it. On its side facing the platen, the tube is provided with a plurality of outwardly extending air suction tubes 376 that are curved upwardly and are of a size at their end portions to fit loosely into the recesses 256 in the advance or forward edge of the table 331, and these air suction tubes are so positioned relative to the extreme forward position of the advance edge of the table as to bring their air suction inlet apertures in straight alinement with the air suction inlet apertures 332 in the suction box 377 of the advance edge of the table. The positioning of these tubes so they will swing up into the recesses 256 of the table in alinement with its air suction apertures is done by proper adjustment of the journal blocks on their supporting bar 370. The oscillating reciprocal swinging movement imparted to this air suction blank gripping nozzle, is necessary in order to withdraw the ends of the air tubes out of the path of the advancing edges of the blanks as they lie on the table gripped to its suction apertures, and also so that the air suction inlet ends of these tubes have a direct upward movement against the under and ungummed side of the blanks, which upward contact movement gives the suction impulse force a firm tight grip on the blanks that enables the tubes to positively hold them against the backward or rearward stroke of the table's reciprocal movement.

There are a number of ways in which an oscillating movement may be given to this oscillating air suction nozzle. We preferably however carry out this feature of our invention in the following manner:

To the lower end portion of the depending nipple portion 369 of the nozzle, a clip 378 is secured, to which one end of a connecting rod 379 is pivotally secured by a cap screw 380. The opposite end of this connecting rod is pivotally secured to a rock-arm 381 intermediate of its ends. One end of this rock-arm is pivotally connected to a shaft 382 that is secured to the side frames of the rear frame of the machine. The opposite end of this rock-arm 381 is provided with a roller 38ᴬ that engages a recess 383 formed in the disk 363 which as it rotates imparts an oscillating movement to the nozzle, the roller 38^A being held against the cam 363 by a spring 384 attached to the lever 381 and to the bed plate. The table on its blank delivereing and discharging movement is moved directly over the platen of the wrapping machine, and the cylinder piston's actuating cam and the oscillating lever's oscillating cam are so relatively timed as to tilt the nozzle up against the blanks at the end of the table's blank advancing movement, and grip and hold it until after the table has moved backward and left the blank resting on the platen of the blank wrapping machine, and the tubes still hold it until the wrapping machine's mechanism takes control of the blank by moving a box down against it, which occurs almost instantly after the blank is left in the grip of the oscillating nozzle's air suction blank receiving and gripping tubes.

There are five air pumps 79, 279, 280, 281, and 282, on the machine, all of which are secured to the bed plate 3. These pumps are all alike and they each consist of a cylinder, to the head ends of which the air tubes are connected that lead to the air suction devices that the air pump provides the air suction force for. Thus the pump 79 connects to the air suction box 65 of the feed roller and the diaphragm 90 through the T fitting 75, where the two air pipe lines come together, and the pump 279 connects by the tube E to air suction tubes 205 of the reciprocating blank carrier 200. The pump 280 connects by the tube 317 to the air tubes 309 of the blank carrier, that takes the blanks from the blank releasing station of the conveyer. The pump 281 connects by the tube F with the air suction box of the blank discharging and delivering table 331 and the pump 282 connects by the tube 367 to the oscillating nozzle. Each cylinder is also preferably provided with an air escape aperture which is positioned relative to the travel of the piston and the throw of the cam mechanism actuating the air pump's piston to break the suction instantly where desired. These air escape apertures can be dispensed with if desired, as the piston can be so quickly reversed by the cam as to change the air suction impulse force to an air pressure impulse force.

Each of these air pumps consists of a cylinder and a piston 384, the piston of each being connected to a crank arm, which in turn is engaged by a cam that is mounted on the main driving shaft of the gumming machine.

Thus the piston 384 of the pump 79 connects with and is secured at one end to a rock arm 81 which is mounted on a shaft 79^A that extends across the frames and is journaled in them. The rock arm 81 is mounted at one end on this shaft and at its opposite end is pivotally connected to the outer end of the piston 384. This rock shaft carries a roller 79^B that engages a cam 79^C that is formed on the disk 80, that is secured on the shaft 82. The piston of the pump 279 is also connected to a rock-arm 79^D, which is also mounted on the shaft 79^A, and this rock-arm is provided with a roller that engages a cam groove that is formed in a disk 79^E that is secured to the main driving shaft 82 of the machine.

The piston of the pump 280 is connected to one end of a rock-arm 80^A that is secured at its opposite end to the shaft 79^A. This rock-arm 80^A is also provided with a roller 79^F which engages a cam groove 79^G that is formed on the opposite side of the disk 80 that is secured on the main driving shaft 82. The piston of the pump 281 is connected to one end of a crank arm 79^H that is secured at its opposite end to the shaft 79^A. This rock-arm is also provided with a roller 80^C that engages a cam groove 80^D that is formed on the opposite side of the disk 79^E, that is secured to the main driving shaft 82. This pump is connected to the air suction box of the blank discharging and delivery table 331 by a flexible tube F, which is operatively connected to it, and to the air pump. The air pump 282 is driven by the rock-arm 359 and the cam 363 which is secured on the auxiliary shaft 82^A, and this pump furnishes an air suction force for the blank receiving oscillating nozzle, as has been fully described in detail above.

The operation of our improved blank gumming machine is as follows:

A pile of box covering blanks, which are usually cut out of large sheets of calendered or other finished surface paper, in a machine especially adapted for that purpose, are stacked up in the blank stacking frame, and the pneumatically operating blank feeding device 205 is adjusted to the size of the blanks to be fed through the machine and gummed. Then the machine is started to running, and the gum supplying roller 4 and the gum distributing roller 5, and the gumming cylinder 6, are adjusted until they feed the desired thickness of coat of gum. The blanks are then fed one at a time at the rate of about fifty per minute from off of the top of the stack of blanks by the pneumatically operating blank feeding device 205, and all these blanks that feed straight and in orderly alinement to the feeding roller 7 are gripped by the air suction apertures of the feed roller's air suction box 65 and are fed to the gumming cylinder 6 against which they are rollingly pressed and fed by the feed roller 7, and they instantly stick to the gum on the gumming cylinder and receive a coat of gum from the rolling pressure they receive against its gum coated surface by the feed roller 7. All those blanks that feed in such a crooked or twisted condition as to leave one or more air suction apertures of the air suction box of the feed roller 7, uncovered and thus open to the atmosphere, are tripped up and stopped instantly and are gripped and removed by the crooked blank removing device 227, and the feeding of the blanks continues automatically without stopping the machine.

When each blank reaches the horizontal central portion of the gumming cylinder, it opens its peripheral segment and exposes the advancing edge of the blank, which is instantly seized or gripped by the finger pickers, which when released by the cam fly into the gap and clamp the exposed edge of the blank to the adjacent cross-bar, as they travel around the transmission cylinder at the same speed as the gumming cylinder, and the blank is transferred by them, and the transmission cylinder 8, to the adjacent blank tempering canvas apron of the conveyer, and each blank is conveyed by the conveyer to the finger pickers' blank releasing station, where it is instantly picked up by the blank advancing air suction tubes and placed on a blank discharging and delivery table, where it is gripped and held by the air suction box of this table, which is so relatively positioned to the blank receiving platen of a box wrapping machine that it can travel directly and centrally over the platen and discharge and deliver each blank to its blank receiving oscillating nozzle, which is adjustably supported on the box wrapping machine to receive any size blank the machine will gum, and which connects to the table so as to grip by its air suction oscillating nozzle and hold to each blank the instant it is released from the table's air suction box, which takes place the instant the blank is received and gripped by the blank receiving and gripping oscillating nozzle. The table then moves backward on the return stroke of its reciprocal movement, and leaves the blank resting on the platen of the box wrapping machine, where it is almost instantly afterward engaged by a pasteboard box which is moved on top of it by the operating mechanism of the box wrapping machine, and at the instant the box engages the blank on the platen the air suction mechanism of the blank receiving and gripping oscillating nozzle releases the blank to the control of the box wrapping machine.

Our invention contemplates broadly a gapped cylinder blank gumming machine that shall be a complete unit within itself, and an entirely separate and independently operating organization within itself, and our machine has been designed to be operated entirely independent of the box wrapping or covering mechanism of any of the box wrapping or covering machines in use.

Our machine is especially adapted however to be used to gum and deliver blanks to the wrapping machines already in use in box making factories, and in order that we may time any box wrapping machine to run in the same blank gumming, discharging and delivering intermittent cycle movement to the platen of the box wrapping machine and operatively use the gummed blanks as fast as delivered to the platen thereof, we connect the box wrapping machine to our gumming machine and operate it in exact blank using unison with the delivery of our blanks to it. This we accomplish by mounting a right angled stub shaft 226 in the supporting frame 385 of the clutch controlled shaft, and which is driven by a pair of bevel gears 386 and 387 that are secured on the meeting ends of these shafts, and on this stub shaft we mount a sprocket wheel not shown which is connected by a sprocket chain which we do not illustrate, but which is operatively connected to suitable receiving mechanism on said box wrapping machine, which we do not illustrate, to properly operate the same in blank using relation to the blank delivering speed of our blank gumming machine. Consequently when a box wrapping or covering machine is thus connected and driven by our gumming machine, our gummed and tempered blanks are delivered to it and are received by it and are instantly utilized by it, as fast as the blanks are delivered to it to cover boxes with.

Our invention presents a new type and character of blank gumming machine, and a machine of very great capacity, and one that will coat blanks with coats of gum of any desired thickness, and will temper them at the same time and deliver them in a perfectly operative flattened out order to a box wrapping and covering machine.

While we have illustrated and described the preferred construction and arrangement of our new gumming machine, we do not wish to be limited to the construction and arrangement thereof shown, as many changes might be made without departing from the spirit of our invention.

Having described our invention, what we claim as new and desire to secure by Letters Patent, is:

1. In a blank gumming machine, a gumming cylinder having a gap and an opening and closing cylindrical segment fitting said gap and arranged to receive and to expose the advancing edge of each blank at predetermined points on said gumming cylinder as it rotates, and means for feeding blanks to said cylinder and means including a conveyer for grabbing their advancing exposed edges and removing them from said gumming cylinder, in the direction in which they would naturally curl, and means for applying a tempering moisture to their ungummed sides while on said conveyer.

2. In a blank gumming machine, a gumming cylinder having a gap and an opening and closing cylindrical segment fitting said gap and arranged to receive and to expose the advancing edge of each blank at predetermined points on said gumming cylinder as it rotates, means for feeding blanks to said cylinder and for grabbing their advancing exposed edges and removing them from said gumming cylinder, in the direction in which they would naturally curl, and means including a gapped transmission cylinder and a conveyer for moistening the ungummed surface of said blank, whereby said blank is evenly moistened and tempered throughout, and pneumatic means including air suction impulse mechanism for discharging said blanks from said conveyer.

3. In a blank gumming machine, a blank gumming cylinder provided with a gap in its peripheral surface, a segment fitting said gap to open or close the same, means for opening said gap at a predetermined point in the rotative movement of said cylinder, means for imparting a coat of gum of predetermined thickness to said cylinder, means including a blank feeding device for feeding a blank to said cylinder with its advancing edge fed onto and against said segment, means for moving said segment at a predetermined point in said cylinder's rotative movement to open said gap and expose the advancing edge of said blank, and means for gripping said exposed advancing edge of said blank and peeling it from said gumming cylinder in the direction in which it would naturally curl, and means for advancing said blank to a tempering treatment.

4. In a blank gumming machine, the combination with gum supplying and distributing mechanism and blank feeding mechanism, of a hollow blank gumming cylinder arranged to receive a coat of gum from said gum supplying and distributing system, said cylinder being provided with an axial gap in its peripheral surface, a segment fitting in said gap to close the same, means for moving said segment within said cylinder to open the gap at a predetermined point in the rotative movement of said gumming cylinder, means for feeding blanks to said cylinder from said blank feeding means with their advancing edges resting on the gummed surface of said segment, means for moving said segment to draw it away from the advancing edge of said blank and expose it in said gap, means including a blank transmitting cylinder and a blank conveyer for gripping the exposed edge of said blank and peeling it off from said gumming cylinder as said cylinder rotates, means connected to said machine for moistening the opposite side of said blanks from their gummed side when on said conveyer.

5. In a blank gumming machine, a hollow gum distributing cylinder provided with a gap, a segment carried by the cylinder and projecting into said gap, its outer surface forming a part of the gumming face of the cylinder and movable in said gap to expose a part of the gap and the gummed surface of the blank, said segment being normally resiliently held against an edge of the gap, and means for actuating the segment at predetermined intervals to cause it to move away from its blank-engaging position.

6. In a blank gumming machine, a rotative gapped blank gumming cylinder, means including a segment for closing and opening said gap at a predetermined point in the rotative movement of said cylinder, means including air suction for feeding orderly alined blanks to said cylinder and for stopping disorderly alined blanks before they reach said gapped gumming cylinder, and means for feeding the advancing edge of blanks onto said cylinder's gap closing member and for opening said gap to expose the advancing edge of said cylinder, and a transmission mechanism arranged to grip the advancing edge of said blank in its exposed position in said gap and peel it off from said gapped gumming cylinder, a plurality of fabric panel members on said blank transmission device adapted to support said blanks as they come from said cylinder, means including a supply of water for applying a moistening temper to said panels and through said panels to the opposite sides of said blank from its gummed side, and means for releasing said blank at a predetermined point in the travel of said transmission mechanism, and for discharging said blank from said blank gumming machine.

7. In a blank gumming machine, a rotative gapped blank gumming cylinder, means including a segment for closing and opening said gap at a predetermined point in the rotative movement of said cylinder, means including air suction for feeding orderly alined blanks to said cylinder and for stopping disorderly alined blanks before they reach said gapped gumming cylinder, and means for feeding the advancing edge of blanks onto said cylinder's gap closing member and for opening said gap to expose the advancing edge of said cylinder, and a transmission mechanism arranged to grip the advancing edge of said blank in its exposed position in said gap and peel it off from said gapped gumming cylinder, a plurality of fabric panel members on said blank transmission device adapted to support said blanks as they come from said cylinder, means including a supply of water for applying a moistening temper to said panels and through said panels to the opposite sides of said blank from its gummed side, and means for releasing said blank at a predetermined point in the travel of said transmission mechanism, and means including a pneumatically operating suction device arranged to engage said blank at its transmission releasing station, for advancing said blank toward its discharging point and for releasing said blank at a predetermined point and position.

8. In a blank gumming machine, a rotative gapped blank gumming cylinder, means including a segment for closing and opening said gap at a predetermined point in the rotative movement of said cylinder, means including air suction for feeding orderly alined blanks to said cylinder and for stopping disorderly alined blanks before they reach said gapped gumming cylinder, and means for feeding the advancing edge of blanks onto said cylinder's gap closing member and for opening said gap to expose the advancing edge of said cylinder, and a transmission mechanism arranged to grip the advancing edge of said blank in its exposed position in said gap and peel it off from said gapped gumming cylinder, a plurality of fabric panel members on said blank transmission device adapted to support said blanks as they come from said cylinder, means including a supply of water for applying a moistening temper to said panels and through said panels to the opposite sides of said blank from its gummed side, and means for releasing said blank at a predetermined point in the travel of said transmission mechanism, and means including a pneumatically operating suction device arranged to engage said blank at its transmission releasing station, for advancing said blank toward its discharging point and for releasing said blank at a predetermined point and position, and means for releasing said blank at said predetermined point and position and pneumatically operating air suction device for simultaneously gripping said blank when released at said predetermined point and position.

9. In a gumming machine, the combination of a blank gumming gapped segment opening and closing cylinder and a coöperating feeding roller, said roller being arranged to feed blanks to said cylinder, said feed roller being mounted on a floating shaft, and means including an adjustably weighted device for setting said shaft so that said feed roller will stand at a predetermined and set distance from said gumming cylinder without coming in contact with the same, said weight controlled roller being arranged to press blanks of different thicknesses against said gumming cylinder, and means on said feed roller controlled by said cylinder for gripping and feeding orderly alined blanks to said gumming cylinder and for stopping disorderly alined blanks at said feeding roller.

10. In a blank gumming machine, the combination of the gapped gumming cylinder, with an operative blank feeding roller, said cylinder being arranged to receive blanks from said blank feeding roller and to coat them with gum, said feed roller being supported by a floating shaft, and means including an adjustably weighted device for setting said shaft so that said feed roller will stand at a predetermined and set distance from said gumming cylinder without coming in contact with the same, whereby varying thicknesses of blanks are held against the surface of said gumming cylinder, said feed roller being provided with means including air suction impulse mechanism under the joint control of said gapped gumming cylinder for gripping and feeding orderly alined blanks to said gumming cylinder and for stopping disorderly alined blanks at said feeding roller's blank gripping station, means including gearing for driving said feed roller from said gumming cylinder, and means for stopping said feed roller long enough to grip and feed each blank before it is fed to said gapped gumming cylinder.

11. In a blank gumming machine, a gum coated blank gumming cylinder having a coöperating blank feeding roller, said roller being provided with air suction producing blank gripping, holding, conveying and releasing mechanism arranged to feed blanks to said gum distributing cylinder, and means including a weight for supporting said feed roller, arranged to feed and press blanks of different thicknesses automatically against said gum coated cylinder.

12. In a gumming machine, the combination with a supporting frame, of a shaft supported blank gumming cylinder, said cylinder being provided with an openable and closable peripheral gapped surface portion adapted to receive and expose the advancing edges of blanks, a blank feeding shaft-supported roller having a blank receiving station, and an air suction producing mechanism for gripping a blank at said station, a mutilated gear on said cylinder's shaft, a mutilated gear on said feed roller's shaft registering with the mutilated gear of said cylinder's shaft, means including a cam controlled rock arm mechanism operated by said cylinder's shaft and cylinder and coöperating with an air suction operating diaphragm controlled mechanism coöperatingly controlled by said feed roller and its mutilated gear and shaft and operatively connected to said air suction producing blank gripping and releasing mechanism for gripping, holding, releasing, and feeding to said gumming cylinder all blanks that are in proper order of alinement when fed to said feed roller's blank receiving station, and for tripping up and stopping at said blank receiving station all blanks not in proper order of alinement.

13. In a blank gumming machine, the combination of a rotary gum distributing cylinder whose gumming face includes a segment occupying a gap formed in the face of the cylinder, and arranged to engage the advancing edge of the blank with a blank transmission cylinder, and an endless traveling conveyer arranged to receive the gummed blanks from the gum distributing cylinder, a number of sets of gripping devices carried by the conveyer and suitably spaced, each set including resilient gripping fingers adapted to grasp the advancing edge of the blank for the purpose of removing the latter from the cylinder, a canvas apron on said conveyer adjacent to each set of blank grippers, and the transmission cylinder in such timed relation to the travel of the cylinder as to allow the fingers of the various sets of gripping mechanism to grip and peel said blanks from said gumming cylinder at its gap portion, said transmission cylinder being provided with a gap in which the sets of grippers fit and rotate with it, and means including mutilated gearing for intermittently rotating said transmission cylinder and the conveyer in timed relation with said gum distributing cylinder.

14. In a blank gumming machine, the combination with a blank gumming cylinder having a blank edge exposing gap, of an endless traveling conveyer arranged to receive the blanks therefrom, the conveyer being equipped with a number of sets of gripping devices adapted to respectively and successively engage the edge of the blanks within the said gap and remove the blanks from the cylinder, each set of such devices including a partially rotating rod spring-actuated in one direction of its movement carrying blank gripping fingers, and means connected with said rod for locking said fingers in an open position and for tripping them to grip a blank at said gumming cylinder.

15. The combination in a blank gumming machine, of a blank gumming cylinder having a blank edge exposing gap, and an endless traveling conveyer arranged to receive the blanks therefrom, the conveyer being equipped with a number of sets of gripping devices adapted to respectively and successively engage the edges of the blanks which overlie the gap, and remove the said blanks from the cylinder, each set of such devices including a spring-actuated rod, gripping fingers mounted thereon, means for locking the said rod in their open position, means for tripping said fingers to cause them to grip a blank at the gumming cylinder, and means for automatically unlocking the fingers to release the blanks and means for removing the released blanks from the conveyer.

16. The combination in a blank gumming machine, with the gapped segment cylinder, of an endless traveling conveyer, and a transmission cylinder arranged to receive jointly the blanks therefrom, the transmission cylinder being provided with a gap arranged to receive the several portions of the conveyer, said conveyer being equipped with a number of sets of blank gripping devices adapted to respectively and successively engage the blanks at the gumming cylinder when said gripping devices are in the gap of the transmission cylinder, each set of blank gripping devices comprising a cross bar, a spring-actuated rod mounted on said bar, gripping fingers mounted on said rod, a ratchet and pawl on said rod for locking the rod to hold the fingers in their open position, and a stationary cam arranged in the path of the pawls of the several sets of devices adjacent to said transmission cylinder for releasing said fingers to grip a blank at the gap of said gumming cylinder, and means for opening the gripping devices for releasing said blank at a predetermined point in the travel of said conveyer.

17. The combination in a blank gumming machine, of the movable segment blank gumming cylinder, and an endless traveling conveyer arranged to receive the blanks therefrom, the conveyer being equipped with cross bars, canvas aprons between said cross bars, a number of sets of gripping devices adapted to respectively and successively engage the blanks to facilitate their removal from the cylinder, each set of devices including a spring-actuated rod attached to said cross bars, gripping fingers mounted on said rod, a ratchet wheel mounted on said rod, a pawl arranged to lock said rod to hold the fingers in an open position, a stationary cam arranged in the path of the pawls of the several sets of devices for unlocking said fingers whereby said spring causes said fingers to fly over and grip a blank against its cross bar, and means for automatically returning the rod to raise the fingers to release said blank from said cross bar, a shaft adjacent to said gumming cylinder, sprocket wheels thereon on which said canvas aprons are supported at one end, means for supporting said conveyer at its opposite end, a transmission cylinder mounted on said shaft having a gap in which said bars and grippers fit and rotate with said cylinder, and means including mutilated gearing by which said rod transmission cylinder and said conveyer rotate in unison with said gumming cylinder to remove the blanks therefrom.

18. The combination in a blank gumming machine, of the segment blank gumming cylinder, with the endless traveling conveyer, and a transmission cylinder arranged to receive the blanks therefrom, the conveyer being equipped with a number of cross bars having fabric panels or canvas aprons between them, a plurality of sets of gripping devices mounted on each alternate cross bar, adapted to respectively and successively engage the blanks to facilitate their removal from the gumming cylinder, each set of devices including a spring-actuated rocking rod, blank gripping fingers mounted thereon arranged to grip the blanks against their respective cross bar, a ratchet and pawl for locking the rod to hold the fingers in their open position, a stationary cam arranged in the path of the pawls of the several sets of devices for unlocking purposes, means for automatically turning the rocking rod to open the fingers to release the blanks, said means including a pinion fast on the rod, gear teeth mounted on a reciprocating lever arranged to be engaged by the pinion, means for actuating the gear teeth at properly timed intervals to impart the necessary movement to the spindle, said last named means including a cam actuated rock arm and lever mechanism, said transmission cylinder having a gap in which said cross bars and fingers fit and rotate with said cylinder, said conveyer and its cylinder being arranged to rotate with an intermittent movement so timed that they stop and grip the blanks at the gumming cylinder and feed them onto the canvas aprons as they feed around said transmission cylinder.

19. The combination in a blank gumming machine, of a blank gumming cylinder, a conveyer coöperating with a transmission gapped cylinder arranged to receive the blanks therefrom in the gap of the transmission cylinder, said conveyer being equipped with blank gripping, supporting and moistening mechanism, and means for automatically and successively actuating the gripping mechanism to release the blanks at a predetermined point in the travel of the conveyer, said means including a reciprocating lever having a toothed segment at its free end, a segment of a pinion on the gripping mechanism, a link connection at one end of said toothed segment, a rock arm connected at one end to said link and at its opposite end to a connecting rod, a rock arm connected at one end to said connecting rod, and a cam engaging the opposite end of said rock arm.

20. In a blank gumming machine, the combination with a supporting frame, of a blank gumming cylinder mounted thereon, having a blank edge exposing gap, and means for normally closing the same, a shaft mounted in said frame, sprocket wheels on said shaft, a conveyer comprising endless chains mounted on said sprocket wheels at one end, cross bars connecting said chains, and arranged to support a series of fabric aprons, a transmission cylinder on the sprocket wheel shaft, in blank receiving relation to the gumming cylinder, said transmission cylinder having a gap in which said cross bars lie and rotate with the cylinder, gripping devices carried by said bars which engage the exposed edges of blanks on the gumming cylinder, and transfer the said blanks to said conveyer and hold them for a predetermined part of the travel of the conveyer, and means for releasing the blanks.

21. In a blank gumming machine, the combination with the blank feeding and gumming gapped cylinder, of a conveyer, the cross bars and canvas aprons on said conveyer, a shaft having a partial rotative movement mounted on each cross bar that lies at the advancing edge of said canvas aprons, blank finger pickers mounted on said shaft and spring controlled to resiliently spring against and grip the advancing edge of a blank, a pawl controlled ratchet wheel mounted on said shaft and arranged to lock said fingers in an open position, means including a cam positioned adjacent to said gapped cylinder for tripping the pawl to allow the fingers to spring forward and grip the advancing edge of a blank against its supporting cross bar, and means including gearing and cam controlled mechanism for releasing each blank from its finger pickers at the discharge end of the conveyer.

22. In a blank gumming machine, blank feeding and gumming mechanism in combination with means for tempering the blanks and conveying them from the gumming mechanism, said tempering and conveying means comprising an endless conveyer provided with a blank gripping station and a blank releasing station and consisting of an endless conveyer provided with a plurality of canvas aprons spaced a predetermined distance apart between said cross bars and arranged to receive each blank from the gumming mechanism, said endless conveyer having a coöperating transmission cylinder provided with a gap and onto and against the peripheral surface of which the aprons roll as said cylinder and conveyer rotate together, each of said aprons being provided with a set of blank gripping finger pickers adapted to grip each blank as it leaves the gumming mechanism, said blank gripper being arranged to fit onto the gap of said cylinder and rotate with it and to grip the blanks when in the gap of said cylinder, and means for imparting a moisture temper to the dry side of the blanks as they rest on said aprons, said means comprising a supply of water adjacent to said transmission gapped cylinder and a fabric wick member arranged in contact with the peripheral surface of said cylinder, and to discharge by capillary action water to the peripheral surface of said transmission cylinder, whereby said canvas aprons are saturated with water as they feed onto the peripheral surface of said transmission cylinder, and whereby said blanks as fed out flat and straight against the saturated surface of said aprons are likewise moistened with water and remain in contact with the water saturated surface of said aprons until said aprons reach the blank releasing station of said conveyer.

23. In a blank gumming machine, the combination of the gapped segment opening and closing blank gumming cylinder and its coöperating gumming rolls and blank feeding mechanism and roller and the gumming cylinders and feed rollers blank tripping mechanism with the endless intermittent movement blank tempering conveyer and its operating mechanism comprising the transmission cylinder, the gearing connecting said transmission and blank gumming cylinder, the supporting endless chains, the blank supporting aprons and the blank gripping fingers arranged and adapted to enter the gap of said gumming cylinder and grip the blank and transmit it to an apron of said conveyer, and with a plurality of air suction air impulse tubes, said tubes being operatively connected to an air suction producing mechanism, said tubes being arranged to engage the blanks with a resilient bearing pressure when released by said conveyer, a slotted bar extending transversely across the machine to which said tubes are adjustably secured, a reciprocating bar arranged to support said air tubes and their supporting bar, means including a vertically reciprocating bar and a cam actuated mechanism for reciprocally raising and lowering said air tubes, and a cam controlled lever mechanism for reciprocating said air suction tubes to advance a blank from its conveyer releasing station, a table on which said tubes deposit said blanks, said table being provided with blank gripping suction apertures arranged to grip the blank when deposited thereon by said air tubes, and means for reciprocally moving said table to convey the blank to a position to be again gripped and conveyed to the platen of a box covering machine.

24. In a blank gumming machine, the combination with blank supporting, feeding and gumming and transmission and delivering mechanisms, comprising the gapped segment opening and closing blank gumming cylinder, the gum distributing rolls and the cylinder's coöperating blank feeding roller and its blank controlling mechanism, of the blank transmission and conveyer mechanism having a blank releasing station, and means including fingers arranged to enter the gap of said cylinder and grip each blank at the blank releasing station of the conveyer and advance it to a position to be fed to the platen of a box covering machine, with means including air suction tubes arranged to move down against said blanks on said conveyer before they are released by the conveyer and lift them therefrom, means including slidewise and a cam operated lever mechanism for advancing said blanks toward their discharge position while held by said air tubes, a table member provided with air suction blank gripping apertures arranged and adapted to receive said blanks from said air tubes, said table being provided with air suction blank gripping mechanism, means connected with said air tube and its blank advancing mechanism for depositing each blank in the air suction apertures of said table, means for simultaneously releasing said blanks when deposited by the air tubes and for gripping them by the air suction mechanism of said table, and means for gripping said blanks when held on said table and for moving them to the platen of a box covering machine, said means comprising a right and left handed threaded shaft, nut blocks threaded to said shaft, a lazy tong device secured at one end to said table and at its opposite end to said nut blocks, and means including a pinion mounted on said shaft and a tooth rock bar in mesh with said pinion and including a cam operated mechanism connected with said rock bar, whereby said rock bar rotates said pinion with said threaded shaft and causes said nut blocks to travel toward and away from the center of said shaft and thereby expand and contract said lazy tongs, which reciprocatively moves said blank holding table to a position to be engaged by a device that will grip the blank on the table and move it to the platen of a box covering machine.

25. In a blank gumming machine, the combination with a gapped blank gumming cylinder, means for feeding blanks thereto, and means for supplying gum to said cylinder, of a supporting frame, sprocket wheels mounted on said frame, a conveyer having a blank receiving station and a blank releasing station, said conveyer comprising a pair of side chains mounted on said sprocket wheels, cross bars extending in pairs transversely across said chains and arranged to support a fabric panel or canvas apron between each pair of area enough to receive and support the largest size blanks the machine will gum, a transmission cylinder at the blank receiving end of said conveyer concentric to its adjacent sprocket wheels, said cylinder being provided with a gap in which said cross bars fit and rotate with said cylinder, means for gripping and holding blanks on each apron at the gap of the cylinder, and means for releasing the blanks at the discharging station of the conveyer, a shaft having a partial rotative movement mounted on each cross bar that lies at the advancing edge of said canvas aprons, blank finger pickers mounted on said shaft and spring controlled to resiliently spring against and grip the advancing edge of a blank, a pawl controlled ratchet wheel mounted on said shaft and arranged to lock said fingers in an open position, means including a cam positioned adjacent to said gapped cylinder for tripping the pawl to allow the fingers to spring forward and grip the advancing edge of a blank against its supporting cross bar, and means including gearing and cam controlled mechanism for releasing each blank from its finger at the discharge end of the conveyer, said means including a cam actuated rock arm and a reciprocating and adjustable stroke rock bar and lazy tong mechanism operatively connected to said table for reciprocating the same to advance said blank into a discharging position.

26. In a blank gumming machine, a blank gumming cylinder for loose wrap work, comprising a hollow cylinder having a perforated surface, and a gapped portion, a reciprocating segment partially filling said gap and movable therein, means for securing raised strips to the surface of said cylinder through said perforations, and means including a cam actuated cross bar arm for moving said segment in one direction, and a spring for throwing it in the opposite direction of its operative movement.

27. In a blank gumming machine, the combination with blank feeding means, of a blank gumming cylinder for gumming blanks for loose wrap work, said cylinder having its surface provided with screw receiving apertures, screws extending through said apertures, adjustable slotted dogs mounted on said screws, strips of any suitable gum receiving and distributing material secured by said dogs and screws to the surface of said cylinder at predetermined points in its circumference to extend longitudinally therewith, and means including a shaft for supporting and gearing for operating said cylinder, and cam actuated and spring controlled means for operatively moving said segment.

28. In a blank gumming machine, a loose wrap blank gumming cylinder, comprising the shaft supported cylinder, said cylinder being provided with a gap, and a segment mounted on said shaft and reciprocally mounted in said gap, the mutilated gears on the end of said cylinder's shaft, the driving gear on said shaft, and the cam on said shaft, the rock shaft adjacent to said cylinder, the crank arm on said rock shaft carrying a roller at its end, said cam actuated shaft being spring controlled in one direction of its movement and cam actuated in the opposite direction of its movement, said cylinder having its surface provided with screw receiving apertures, adjustable dogs secured to said cylinder by said screws and projecting glue receiving strips adapted to gum the marginal sides and edges of blanks secured to said cylinder by said dogs and screws in predetermined blank receiving positions, said segment being extended to even with the peripheral surface of said blank gumming strips and arranged and adapted to gum an edge of said loose wrap blanks, and said rock arm and its roller being arranged to grip the blank and retain it on the loose wrap gumming cylinder while its gummed edge is being released by said segment.

29. In a blank gumming machine, a loose wrap gumming cylinder comprising a hollow cylinder, a gap in its surface, and a reciprocating segment in the gap, the surface of said cylinder being provided with projecting strips of predetermined heights and widths arranged thereon, and means for adjustably securing said strips to said cylinder, and means including a cam and spring operated rock shaft and rock arms coöperating with said segment for operatively moving said segment to gum and then to release the edge of the blank, the peripheral surface of said segment being arranged in blank receiving relation to the peripheral surface of the projecting strips on said cylinder, and a roller equipped rock arm arranged to hold the blanks on said cylinder while the segment releases the gummed edges of said gummed loose wrap blanks.

30. In a blank gumming machine, the combination of blank feeding, gum supplying and conveying and discharging mechanism, with a loose-wrap blank gumming cylinder adapted to gum the edges only of blanks, said cylinder comprising a hollow gapped cylinder provided with a segment portion reciprocating on said gap, the surface of which is adapted to receive gum and move away from the advancing edges of blanks as they feed through the gumming machine, means for reciprocating said segment, means including raised strips of predetermined length and width adjustably secured to the surface of said cylinder to receive and impart a coat of gum to the edges of blanks, means including a pressure roller for clampingly gripping the blanks with a rolling pressure against said cylinder while said segment moves from under the edge of said blank, and the blank gripping conveying and releasing conveyer arranged to grip the gum edges of said blanks when exposed in said gap by said segment.

31. In a blank gumming machine, the combination of the gapped cylinder having a reciprocating gum distributing segment, means including the cam actuated crank lever and the spring for operating said segment, gum distributing strips mounted on the surface of said cylinder, means including slotted dogs for securing said strips in predetermined adjusted positions on said cylinder to gum the edges of blanks, and a blank holding mechanism arranged out of the path of said gumming surfaces for holding said blanks against accidental slipping movement when said segment moves from under the advancing edge of the blanks.

32. In a blank gumming machine, the gumming cylinder provided with a gap in its surface, raised strips adjustably secured to its surface and adapted to receive and distribute a coat of gum to blanks along their edge portions, a reciprocating segment in said gap adapted to receive and distribute gum to the advancing edge of blanks and to move away from them and leave their advancing edge exposed in said gap, a raised surface on said cylinder adjacent to said segment of less height than the gum distributing strip of said cylinder, and a resiliently operating cam actuated roller arranged to grip the blanks against said strip while said segment is moving away from the gummed advancing edge of said blanks that rest on it.

33. In a blank gumming machine, the combination of adjustable gum supplying and gum distributing mechanism and blank feeding mechanism, of a loose-wrap blank gumming cylinder comprising a hollow gapped cylinder operatively mounted and provided with a movable segment reciprocally mounted in its gap and arranged to impart gum to the advancing edges of blanks, and to be moved away from them, and thus expose their advancing gummed edge in said gap, with a plurality of raised strips adjustably secured on said cylinder adapted to distribute gum to the edges of blanks, and means including a resiliently pressing roller for holding the blank on said cylinder while said segment moves from under the advancing edge of said blank.

34. In a blank gumming machine, a blank gumming cylinder for loose wrap work, comprising a hollow cylinder having a perforated surface, and a gapped portion, a reciprocating segment partially filling said gap and movable therein, means for securing raised strips to the surface of said cylinder through said perforations, and means including a cam actuated cross bar arm for moving said segment in one direction, and a spring for throwing it in the opposite direction of its operative movement, said strips comprising independently adjustable strips for applying gum to the whole of the edges and also the corners of one side of the blank and such portions of the central part of the outer edges of said blanks as is desired.

35. In a blank gumming machine, the combination with a supporting frame and a blank gumming cylinder mounted therein, of a gum pan mounted in said frame, a gum supplying roller journaled in swinging bearings mounted on said frame, to project into said pan, vertically disposed slideways on said frame, bearings mounted in said slideways, a gum distributing roller mounted in said bearings, and screws for adjusting said bearings to define the position of the distributing roller, with respect to the gumming cylinder, and screws mounted in the frame, and engaging the said swinging bearings to vary the pressure of the supplying roll upon the distributing roll.

36. In a blank gumming machine, the combination with the supporting side frames of a gum holding pan supported between said frames, swinging journal levers pivoted at one of their ends to the inside of said frame, open sided journaling recesses in the opposite ends of said swinging journal levers, a shaft journaled in said swinging journal levers, a gum supplying roller mounted on said shaft and rotating in said pan, a gum distributing roller adjustably journaled in said side frames in adjustable contact with the surface of said gum supplying roller, the open recess of said swinging journal levers facing said gum distributing roller, set screws threaded to each side frame and arranged to bear and support each of said swinging journal levers to hold said gum suplying roller against the surface of said gum distributing roller, and means for rotating said gumming cylinder and its gum distributing roller at the same rotative speed and the gum supplying roller at a slower speed than the gum distributing roller.

In testimony whereof we affix our signatures in presence of two witnesses.

MELVILLE E. PETERS.
GEORGE H. FATH.
ALBERT F. MILLER.

Witnesses:
G. SARGENT ELLIOTT,
KATHERINE V. BAKER.